United States Patent
Mazel

(10) Patent No.: US 11,460,404 B1
(45) Date of Patent: Oct. 4, 2022

(54) METHOD AND SYSTEM FOR DISTINGUISHING A FLUORESCENT SUBJECT OF INTEREST FROM OTHER FLUORESCENT SUBJECTS OR FLUORESCENT BACKGROUND

(71) Applicant: Charles H. Mazel, Bedford, MA (US)

(72) Inventor: Charles H. Mazel, Bedford, MA (US)

(*) Notice: Subject to any disclaimer, the term of this patent is extended or adjusted under 35 U.S.C. 154(b) by 0 days.

(21) Appl. No.: 17/589,767

(22) Filed: Jan. 31, 2022

Related U.S. Application Data

(60) Provisional application No. 63/262,114, filed on Oct. 5, 2021.

(51) Int. Cl.
 *G01N 21/64* (2006.01)
(52) U.S. Cl.
 CPC ..... *G01N 21/6456* (2013.01); *G01N 21/6447* (2013.01); *G01N 2021/6439* (2013.01)
(58) Field of Classification Search
 CPC .......... G01N 21/6456; G01N 21/6447; G01N 2021/6439
 See application file for complete search history.

(56) References Cited

U.S. PATENT DOCUMENTS

| | | | |
|---|---|---|---|
| 7,209,223 B1* | 4/2007 | Hull | G01N 21/645 356/73 |
| 9,220,403 B2 | 12/2015 | Hartung et al. | |
| 9,816,930 B2 | 11/2017 | Moriyama et al. | |
| 2003/0205682 A1* | 11/2003 | Kapoor | G01J 3/4406 250/458.1 |
| 2007/0096039 A1* | 5/2007 | Kapoor | G01J 3/433 250/458.1 |
| 2012/0203086 A1* | 8/2012 | Rorabaugh | A61B 5/0068 600/321 |
| 2013/0256563 A1* | 10/2013 | Kalkbrenner | G01N 21/64 250/459.1 |
| 2014/0235973 A1* | 8/2014 | Brittenham | A61B 5/0071 359/578 |
| 2016/0195704 A1* | 7/2016 | Kalkbrenner | G02B 21/365 348/79 |
| 2016/0281151 A1* | 9/2016 | Kubo | G01N 21/6458 |

(Continued)

OTHER PUBLICATIONS

Billinton, Nicholas et al., "Seeing the Wood Through the Trees: A Review of Techniques for Distinguishing Green Fluorescent Protein From Endongenous Autofluorescence", Analytical Biochemistry 291, 175-197 (2001), Published online Mar. 16, 2001.

*Primary Examiner* — Marcus H Taningco
(74) *Attorney, Agent, or Firm* — Hamilton, Brook, Smith & Reynolds, P.C.

(57) ABSTRACT

A method and system described herein provide enhanced discrimination of fluorescence of interest from fluorescence from extraneous sources. The method and system use one or more illumination sources to produce two or more excitation outputs configured to exploit differences in excitation spectra between the fluorescence of interest and the extraneous fluorescence to create a condition in which the extraneous fluorescence appears steady and the fluorescence of interest blinks, or vice versa. This method and system preferentially draw attention to the fluorescence of interest for visual detection by a human or for optical detection by an electronic system for automated detecting and processing.

23 Claims, 17 Drawing Sheets
(6 of 17 Drawing Sheet(s) Filed in Color)

(56) References Cited

U.S. PATENT DOCUMENTS

| | | | |
|---|---|---|---|
| 2017/0127981 A1* | 5/2017 | Vermeulen | A61B 5/0059 |
| 2018/0195963 A1* | 7/2018 | Imoto | G01N 21/6458 |
| 2020/0092478 A1* | 3/2020 | Sumpf | H04N 5/23219 |
| 2020/0138351 A1 | 5/2020 | Kerbage et al. | |
| 2020/0150044 A1* | 5/2020 | Kalkbrenner | G02B 27/58 |

* cited by examiner

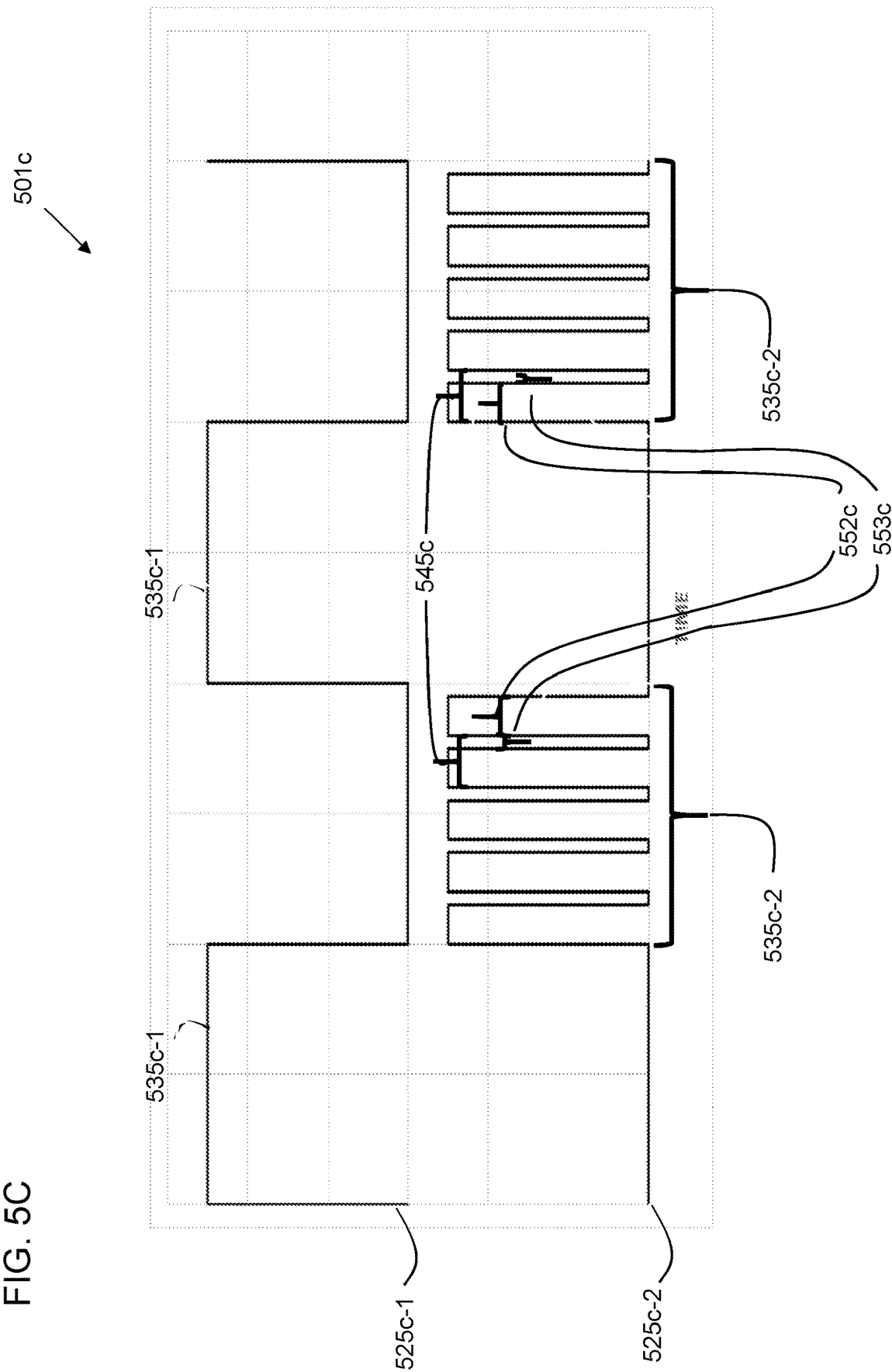

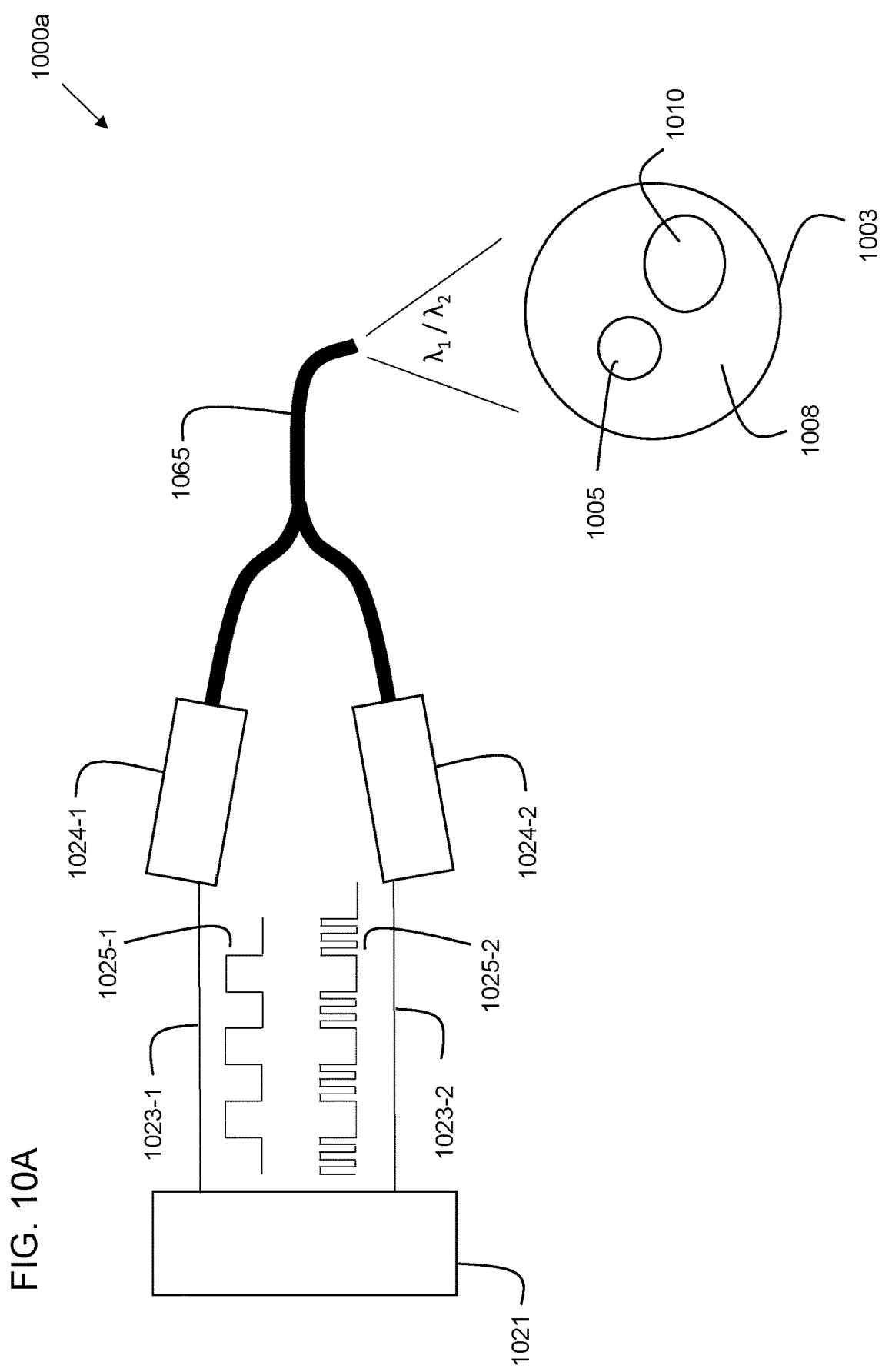

METHOD AND SYSTEM FOR DISTINGUISHING A FLUORESCENT SUBJECT OF INTEREST FROM OTHER FLUORESCENT SUBJECTS OR FLUORESCENT BACKGROUND

RELATED APPLICATIONS

This application claims the benefit of U.S. Provisional Application No. 63/262,114, filed on Oct. 5, 2021. The entire teachings of the above Application are incorporated herein by reference.

BACKGROUND

Fluorescence viewing and imaging techniques are used in many applications due to their power in creating contrast between a subject of interest and other features in a field of view, such as between a subject and its background, or between discrete subjects. Fields of application are varied and include: biology; medicine; industry, such as non-destructive testing, failure analysis, pore structure identification, and more; forensic sciences; scientific research utilizing fluorescent proteins or fluorescent stains; geology; microplastics research, and many more. There are many possible sources of fluorescence, including naturally occurring or man-made substances. Example substances include, but are not limited to: various biological organisms; chemical or biomedical additives such as fluorescent dyes or stains; residues from cleaning products; and engineered fluorescent proteins.

In many instances it is adequate to supply a basic means of viewing a fluorescence of interest, including, for example: a light source capable of exciting the fluorescence of the subject of interest; an optional barrier filter, placed between the subject and the viewer, to block reflected excitation energy, and to transmit the fluorescence of interest; and a detector element, whether eye, still camera, video camera, photodetector, or other means.

In other instances, however, the ability to detect or isolate the fluorescence of interest using this basic approach may be negatively affected by the presence of extraneous fluorescing features in the field of view. These may include, for example, a general autofluorescence from the subject's background, or the existence of localized sources of fluorescence other than the feature of interest. There may be direct confusion arising from similarity in appearance (color and/or intensity), or simply by the presence of distracting elements.

Enhanced discrimination is sometimes provided by using a bandpass filter rather than a longpass filter in the viewing path, to isolate the fluorescence of interest better from that of extraneous features in the field of view. For example, in working with Green Fluorescent Protein (GFP) in plant leaves, the natural red fluorescence of chlorophyll in the leaves can overwhelm the green fluorescence emitted by the GFP. Use of a green bandpass filter prevents the red chlorophyll fluorescence from being viewed, thereby enhancing the contrast. This approach works well when the fluorescence of interest and the extraneous fluorescence have quite distinct emission spectra, but will not be as useful in cases in which there is substantial overlap between the spectral emission of the fluorescence of interest and that of the extraneous fluorescence.

Yet other methods for reducing interference or distraction from extraneous fluorescing features involve taking sequential images under specified illumination conditions and subtracting one from the other to produce a resultant image that highlights the fluorescence of interest. Even more sophisticated techniques exist that involve time-resolved measurement of the fluorescence emissions in order to distinguish among them. Techniques involving spectral discrimination of fluorescing features in an image are commonplace, but generally require collection of successive images made with different illumination sources, use of a spectrometer, or both.

SUMMARY

An example embodiment of the present invention is a method, or corresponding apparatus or system, for distinguishing a fluorescent feature, or features, of interest from an extraneous fluorescent feature, or features. Such an extraneous feature, or features, might be a discrete source of fluorescence or a general fluorescent background. It should be understood that a fluorescent feature of interest and an extraneous fluorescent feature may each be one or more features, and singular and plural forms are used interchangeably herein.

The example method comprises illuminating an illumination region with at least two excitation outputs of at least one illumination source, the at least one illumination source sequentially providing the at least two excitation outputs in different respective wavelength ranges, the at least two excitation outputs being functions of a common drive frequency with respective illumination periods being substantially nonoverlapping. The drive frequency is capable of causing fluorescent features in the illumination region to emit fluorescence with a flicker observable to an observer, e.g., detectable by a human observer, or by an appropriate image processing system or detector, in response to at least one of the at least two excitation outputs. The fluorescent features include the fluorescent feature of interest and the extraneous fluorescent feature. The method further includes controlling an intensity of illumination of at least one of the at least two excitation outputs during its illumination period. The controlling causes the fluorescence emission of a given one of the fluorescent feature of interest and the extraneous fluorescent feature to be functionally equivalent during the respective illumination periods of the sequentially provided at least two excitation sources, resulting in an appearance of the given one to emit fluorescence at a constant level. The contrast between the blinking fluorescence and the constant fluorescence provides an enhanced means of discrimination.

The method may include controlling the intensity of the at least one of the at least two excitation outputs, during an illumination period thereof, through any of a number of techniques known in the art, including, but not limited to: modulation techniques such as pulse width modulation; current regulation; addition of a filter that reduces an apparent intensity of a given excitation output; and selection of an illumination source with inherently appropriate output intensity level.

It should be understood that, in some embodiments, the at least one illumination source described herein may be at least two illumination sources, and, as such, may be physically coupled or otherwise mutually disposed upon or within a common circuit board, substrate, package, or the like, to the extent that the described at least two illumination sources may be considered a single physical unit or light source, as long as such a single physical unit is configured to provide at least two excitation outputs in different respective wavelength ranges.

The wavelength ranges of the at least two respective wavelength ranges and of any fluorescence emission wavelengths described herein are not necessarily limited to the range of human vision (approximately 400-700 nm) but may also include infrared radiation or ultraviolet radiation, which can be detected by an appropriate electronic sensor.

The method may further comprise adjusting the controlling to cause the fluorescence emission of the fluorescent feature of interest to have an appearance of emitting fluorescence at a constant level and the extraneous fluorescent feature to flicker. Alternatively, the method may further comprise adjusting the controlling to cause the fluorescence emission of the extraneous fluorescent feature to have an appearance of emitting fluorescence at a constant level and the fluorescent feature of interest to flicker.

The method may further comprise filtering fluorescence emission by a filter that substantially transmits the fluorescence emission from the fluorescent feature of interest.

The method may enable a human observer to adjust the drive frequency, the intensity control, or both.

The observer may alternatively be a fluorescence emission acquisition system configured to perform the method and automatically process sequential images to determine flickering of a pixel area and adjust the controlling as a function of the flickering of the pixel area. The method performed by the fluorescence emission acquisition system may further capture images at a frame rate, wherein the drive frequency is an integer multiple below the frame rate. The illumination period of the at least two excitation outputs may alternate at a rate at which the fluorescence emission acquisition system observes a flicker at a frequency of 50% of the frame rate or below.

The method may, for an observer that is a fluorescence emission acquisition system, further comprise automatically processing sequential images to determine flickering of a pixel area and presenting an augmented display of information from at least in the illumination region as a function of the flickering.

The fluorescent feature of interest may include at least one fluorescent feature of interest, and the extraneous fluorescent feature may include at least one extraneous fluorescent feature.

An alternative embodiment may include a system that includes at least one illumination source providing at least two excitation outputs in different respective wavelength ranges, along with an intensity controller, mutually configured to perform the method described above.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments. The data presented in the drawings are for the purpose of explanation and are in no way meant to limit the choice of wavelength options for excitation sources or the range of fluorescence characteristics to which the method may be applied.

FIGS. 5A-C are waveform diagrams for activating and deactivating two excitation sources, including the application of pulse width modulation for intensity control, according to an example embodiment of the present disclosure.

FIGS. 9A, 9B, 10A, and 10B are schematic diagrams of various example embodiments of a system for distinguishing a fluorescent feature of interest from an extraneous fluorescent feature.

DETAILED DESCRIPTION

A description of example embodiments follows.

Existing methods for reducing interference or distraction from extraneous fluorescing features, including some more sophisticated approaches, such as existing methods involving time-resolved measurements or spectral discrimination, are not generally amenable to use by an operator in the field, and the expense of the equipment involved may be an impediment to implementation even in a laboratory environment. There are instances in which direct observation of fluorescence by a human observer or video camera, either in the field or the laboratory, would benefit from a method and system that provides immediate and directly observable enhancement of the ability to discriminate the fluorescence of a feature of interest from extraneous sources of fluorescence. It would furthermore be beneficial if such a method and system were implemented in handheld or other easily field-deployable manner.

Described herein is a method, and corresponding system for bringing said method to practice, to provide enhanced discrimination of fluorescence of interest from extraneous sources of fluorescence. For simplicity, hereinbelow, the extraneous fluorescence is referred to as FE and the fluorescence of interest is referred to as FI. The method is based on using one or more illumination sources to produce two or more excitation outputs with which to illuminate the FI and the FE, and exploiting differences between excitation spectra of the FI and the FE in order to create a condition in which the FE appears constant and the FI blinks, or vice versa. This would preferentially draw attention to the FI for visual detection, or could be detected and processed automatically by an electronic system.

The method is explained hereinbelow in reference to the figures.

Figure 1:
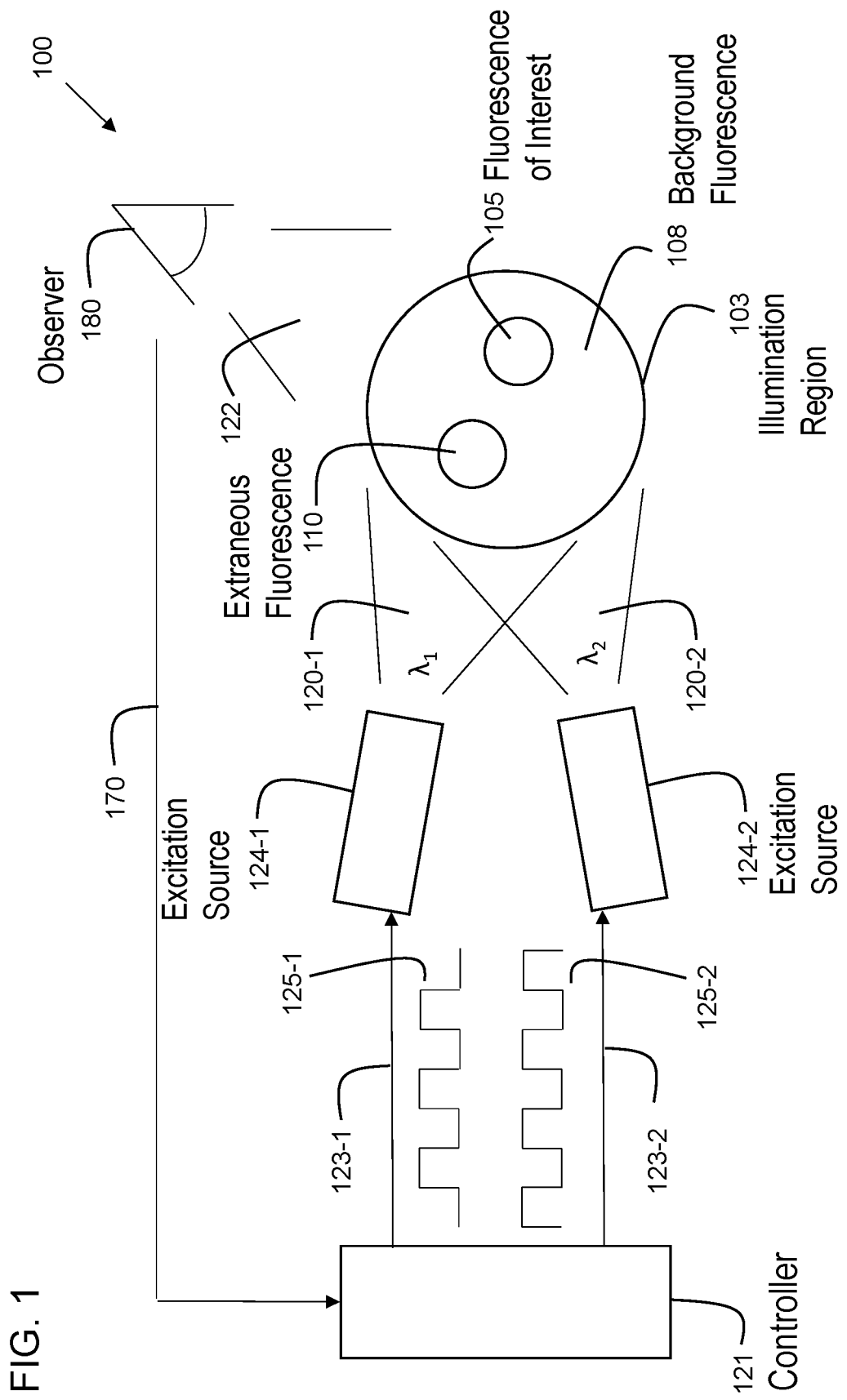
FIG. 1 is a schematic diagram that generally illustrates an apparatus that is configurable to support embodiments according to the present disclosure.

FIG. 1 is a schematic diagram of a generalized apparatus 100 that provides support for embodiments of the method and system described herein. In depicting the apparatus 100, the diagram of FIG. 1 illustrates a central concept of the method and system. Two illumination sources 124-1, 124-2, of appropriate wavelength and intensity for exciting fluorescence 122, are directed at a common illumination region 103. In some embodiments, a fluorescent sample is arranged within the illumination region 103 such that the illumination sources 124-1, 124-2 produce a substantially uniform field of illumination across substantially the entire area of the fluorescent sample. The illumination region 103 includes one or more FI regions 105 and one or more FE regions 110. The illumination region 103 itself may have a generalized background extraneous fluorescence 108. In some embodiments, the background fluorescence 108 is treated as an FE 110 and stimulated to fluoresce accordingly, such that the FI 105 may be particularly distinguished from the background fluorescence 108. In some embodiments, illumination sources 124-1, 124-2 include, for example, arc lamps, laser diodes (e.g., fiber-coupled diode lasers), LEDs, or any other light-emitting apparatus able to provide appropriate intensity and wavelength for providing first and second excitation outputs 120-1, 120-2 as described hereinbelow.

Continuing with respect to FIG. 1, a controller 121 provides drive signals 123-1, 123-2 with waveforms 125-1, 125-2 that cause the illumination sources 124-1, 124-2 to be energized in an alternating, substantially non-overlapping manner, and thereby emit controlled beams of light, i.e., the excitation outputs 120-1, 120-2. Means are also provided (not shown in FIG. 1) to control intensity or effective intensity of one or both of the illumination sources 124-1, 124-2 during ON periods thereof. The fluorescence 122 emitted by fluorescent features 105, 108, 110 in the illuminated area 103 is viewed by an observer 180. The observer 180 may be a human, or may be a video camera or other electronic observing means.

The illumination sources 124-1, 124-2 of FIG. 1 respectively emit beams of light 120-1, 120-2 in two different spectral ranges $\lambda_1$ and $\lambda_2$ that may excite fluorescence of one or both of the FI 105, and the background fluorescence 108 or FE 110. The emitted beams of light 120-1, 120-2 may thus be referred to as excitation outputs 120-1, 120-2. The intensity of the emitted fluorescence 122 from the fluorescing material 105, 108, 110 depends on the wavelengths and intensity of the incident excitation outputs 120-1, 120-2, and their interaction with the fluorescing material 105, 108, 110. The means of controlling 121 the actual or effective intensity of the light 120-1, 120-2, incident on the subjects 105, 108, 110 enables the observer 180 to adjust the corresponding emitted fluorescence 122 via a feedback or manual control mechanism 170. By adjusting the actual or effective intensity of the light 120-1, 120-2 so that the apparent fluorescence of either the FI 105 or of the background fluorescence 108 or FE 110 is effectively the same during the ON periods of both illumination sources 124-1, 124-2, a given fluorescence will appear to be constant (e.g., FI 105), while the other fluorescence (e.g., the background fluorescence 108 and/or FE 110) will flicker (blink) at a rate corresponding to the frequency of the drive signals 125-1 and 125-2.

Blinking lights are effective at attracting attention. If a blinking light in a human-observed system is at a frequency below the flicker fusion frequency of human vision, the blinking will be evident to a human observer. Similarly, for machine-based systems, if the illumination source pulsing is appropriately synchronized with the imaging frames of a video camera, a resultant video sequence of images will capture this pulsating fluorescence. Pulsed excitation sources have been used to a limited degree in fluorescence applications for the purpose of enhancing the ability to see fluorescence in the presence of ambient light. This approach alone would not help in the challenge of distinguishing a fluorescence of interest from extraneous fluorescence excited by the same light source, as the pulsing would cause all fluorescing features such as features 105, 108 and 110 in the system 100 to blink in a corresponding manner, whether the feature is the FI 105 or the background fluorescence 108 or FE 110. In accordance with embodiments of the present disclosure, the blinking would be restricted to only a subset of the fluorescing features 105, 108, 110, thereby enhancing the ability of the system 100 to detect, and discriminate among, the fluorescing features 105, 108, 110. This provides the benefit of the detection enhancement of a pulsed source and overcomes the limitation of a single pulsed source that would cause both the FI 105 and the background fluorescence 108 or FE 110 to appear to blink at the same rate.

Figure 2:
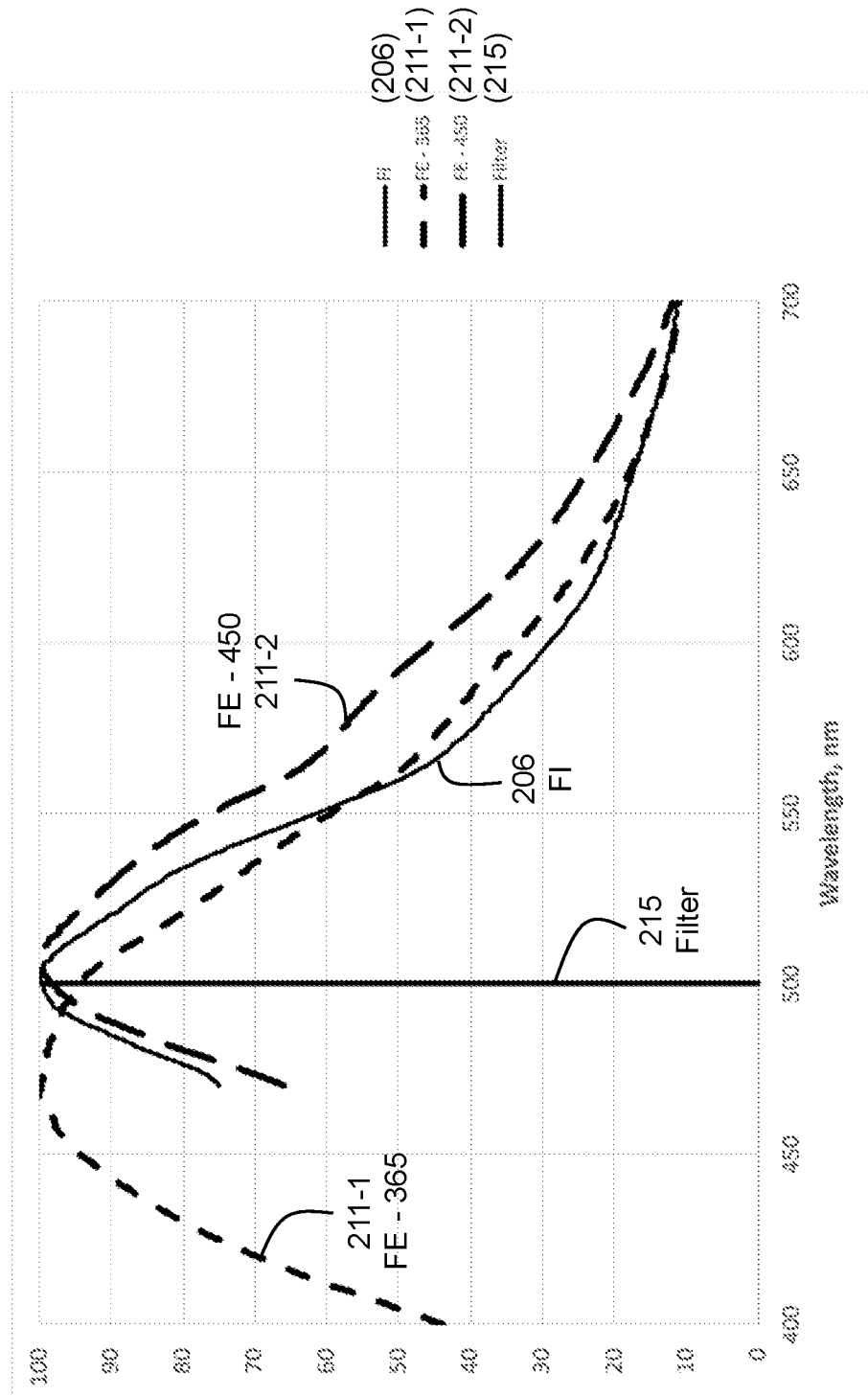
FIG. 2 is a spectral diagram that illustrates fluorescence emission characteristics of a representative fluorescent sample to be used in an embodiment according to the present disclosure.
Figure 3:
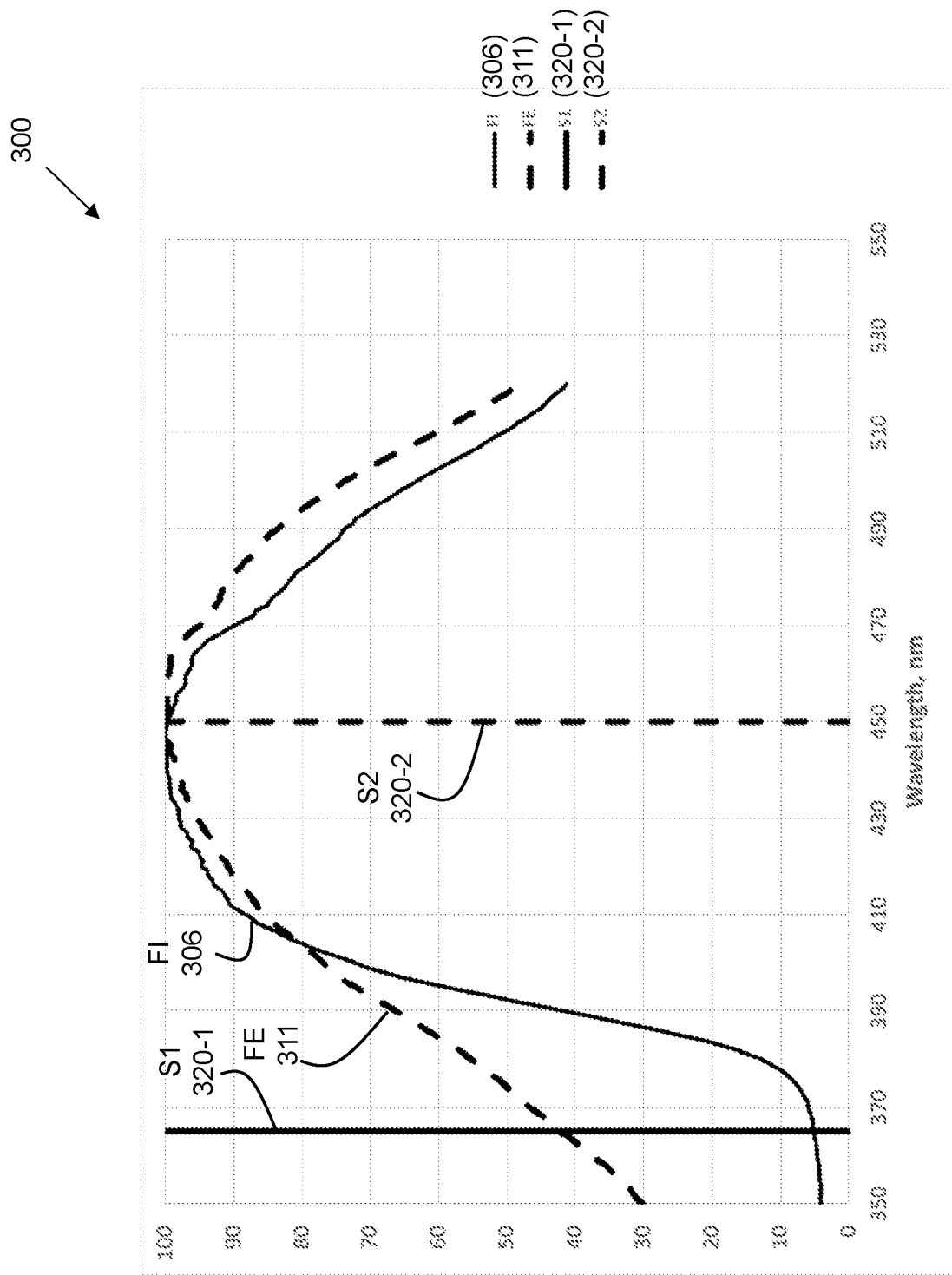
FIG. 3 is a spectral diagram that illustrates fluorescence excitation characteristics of a representative fluorescent sample, and of a selection of excitation light source wavelengths, to be employed in an embodiment according to the present disclosure.

FIG. 2 and FIG. 3 illustrate fluorescence spectral emission and excitation data, respectively, for a representative FI 105 and FE 110 that will aid in explaining embodiments of the method.

FIG. 2 illustrates a spectral diagram 200 showing the fluorescence emission data of a representative fluorescent sample. The data shown by the diagram 200 are for two separate fluorescent materials of the representative fluorescent sample and demonstrate how two spectrally distinct sources of fluorescence may produce similar appearances to an observer, thus creating one type of discrimination challenge to which an embodiment is addressed. These two separate fluorescent materials are shown in FIG. 2 as having distinct emission spectra, namely, an FI emission spectrum 206 for the FI 105, and FE emission spectra 211-1, 211-2 for the FE 110. The FI emission spectrum 206 and the FE emission spectra 211-1, 211-2 can be seen in FIG. 2 to overlap. The line with the shorter dashes 211-1 is the emission spectrum for FE 110 when excited with a wavelength of about 365 nm. This broad emission appears bluish-white to the human eye when viewed without an emission barrier filter or with an emission barrier filter that only blocks ultraviolet light. The line with the longer dashes 211-2 is the emission spectrum for this same subject FE 110 when excited by a wavelength of about 450 nm. The thin solid line 206 is the emission spectrum for the FI 105 when excited by a wavelength of about 450 nm. The vertical solid line 215 represents the nominal cutoff wavelength of a barrier filter that generally blocks wavelengths shorter than 500 nm and transmits wavelengths longer than 500 nm. This is representative of the type of barrier filter that would normally be used in conjunction with a 450 nm excitation source when viewing fluorescence by eye or with a video or still camera.

Note that the portions of all three emission spectra 206, 211-1, 211-2 shown in FIG. 2 are similar at wavelengths longer than 500 nm. While these may be distinguished by a spectrometer or other form of specialized detector, when viewed through a barrier filter such as is represented by spectral cutoff line 215 they look quite similar and are difficult to distinguish when viewed by eye or by a camera. Even with some degree of differentiation in appearance, the presence of multiple sources of fluorescence within a field of view can be a distraction to reliable recognition of a fluorescence of interest.

We therefore need an improved method for highlighting a fluorescence of interest relative to other sources of fluorescence in the viewing area in these cases where there could be confusion by the kind of spectral overlap illustrated in FIG. 2 or distraction by the presence of extraneous features.

FIG. 3 is a spectral diagram 300 showing representative spectral fluorescence excitation characteristics for the two fluorescing substances, the FI 105 and the FE 110. The thin solid line 306 is the excitation spectrum for the FI 105, while the thick dashed line 311 is the excitation spectrum for the FE 110. Both of these spectra 306, 311 are actual measurements from real-world samples, the same ones represented in FIG. 2. The vertical lines represent nominal wavelengths for two different fluorescence excitation outputs, i.e., lights, S1 (solid line) 320-1 and S2 (dashed line) 320-2, at 365 nm (in the ultraviolet) and 450 nm (in the blue), respectively. These can be considered to correspond to the illumination beams 120-1 and 120-2 with respective wavelength ranges $\lambda_1$ and $\lambda_2$ depicted in FIG. 1. S1 320-1 and S2 320-2 are chosen so that they are significantly different in their potential to excite fluorescence from the FI 105 and the FE 110. In this case, the curve 311 indicates that fluorescence emission from FE 110 can be excited by both S1 320-1 and S2 320-2, while the curve 306 indicates that fluorescence emission from FI 105 is not well excited by S1 320-1 but can be effectively excited by S2 320-2.

Example embodiments utilize differences in excitation characteristics such as are illustrated in FIG. 3 in an enhanced pulsed excitation approach, such as described above with regard to FIG. 1, to create a condition in which either a fluorescence of interest or an extraneous fluorescence fluctuates (i.e., blinks) in intensity at a frequency controlled by the pulsed excitation, while the other fluorescence has an effectively constant emission.

For simplicity, the example embodiments described below are in context to an embodiment providing two alternately-pulsed excitation outputs. Embodiments relate to the field of fluorescence detection either by visual or electronic means. In some embodiments, the relative illumination intensities of the sources may be controlled by modulation thereof, such as, for example, by use of a hardware, firmware, or software timing controller, through which a user may be considered to have indirect control of the relative illumination intensities by way of applying an activation signal to a circuit or subsystem having the hardware, firmware, or software timing controller.

If S1 320-1 and S2 320-2 of FIG. 3 are the wavelength outputs of the illumination sources 124-1 and 124-2 of FIG. 1 respectively, then the illumination area 103 of FIG. 1 will be illuminated by the illumination sources 124-1 and 124-2 in the alternating manner respectively depicted by the waveforms 125-1 and 125-2. During illumination by illumination source 124-1 providing excitation S2 320-1, there will be a fluorescence response from the FE 110 but little to no response from the FI 105. During illumination by S2 320-2 there will be a fluorescence response from both the FE 110 and the FI 105. Thus, the FE 110 will emit fluorescence during both illumination periods, while the FI 105 will only emit significant fluorescence during illumination by illumination source 124-2. Since one or the other of the illumination sources 124-1 and 124-2 is energized at all times, the FE 110 will always be emitting fluorescence.

While the FE 110 will thus always be emitting fluorescence, the intensity of that fluorescence emission 211-1, 211-2 may differ from one of the successive illumination periods to the next. This is because the intensity of the fluorescence emitted by the FE 110 during each of the successive illumination periods will depend on the wavelength and intensity of the incident excitation output and its interaction with the fluorescing material of the FE 110. If the fluorescence emitted by the FE 110 is different in response to one illumination source 124-1 with spectral output 320-1 versus the other illumination source 124-2 with spectral output 320-2, then this change in fluorescence, i.e., a brightness thereof, will create a flickering effect. Thus, there is a need for a means of controlling the actual or effective illumination intensity of one or both of the illumination sources 124-1 and 124-2 to adjust the emission intensities from the FE 110 during each of the successive illumination intervals so that they appear effectively the same to the observer 180.

There are various means of controlling the actual or effective intensity of an illumination source, including: controlling the drive current to a light-emitting diode (LED) or laser diode; pulse width modulation (PWM) of a constant-intensity light source; use of external filters or diffusers to reduce intensity; design of a light source to produce a specific intensity; and others.

Figure 4:
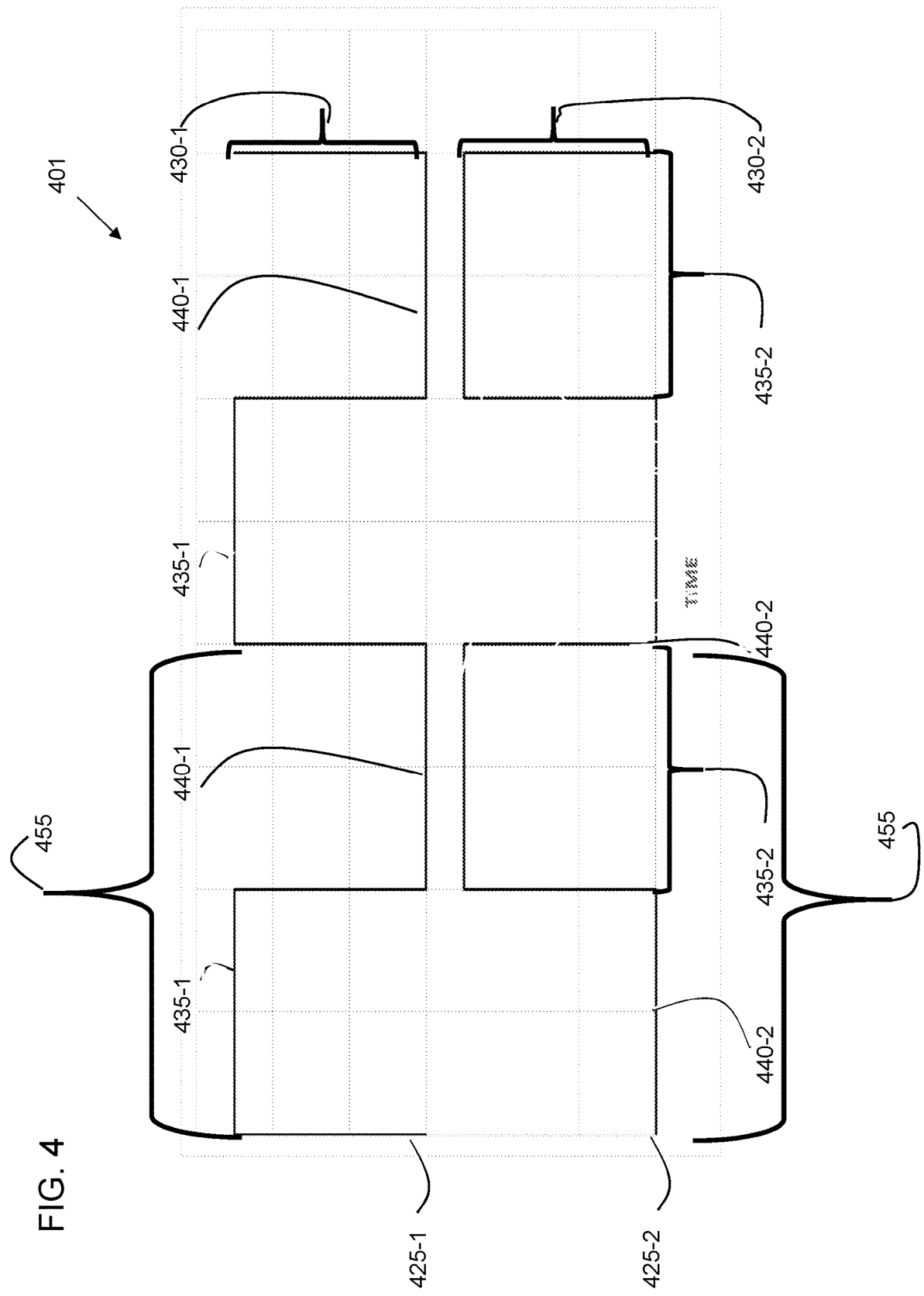
FIG. 4 is a waveform diagram for activating and deactivating two excitation light sources according to an example embodiment of the present disclosure.

FIG. 4 is a waveform plot 401 for an embodiment of a method of distinguishing a fluorescent feature of interest from an extraneous fluorescent feature. The waveform plot 401 represents drive signals 425-1, 425-2 respectively providing two excitation outputs, for example, S1 320-1 and S2 320-2, in a synchronized manner. The drive signals 425-1, 425-2 activate at least one illumination source, causing the at least one illumination source to produce the two excitation outputs 320-1, 320-2. The two excitation outputs 320-1, 320-2, in turn, alternate such that one 320-1/320-2 or the other 320-2/320-1 of the excitation outputs is always active, but when S1 320-1 is ON 435-1 (the upper trace), S2 320-2 is OFF 440-2 (the lower trace), and vice versa 440-1, 435-2. For human visual detection, the frequency of this alternation (i.e., drive frequency), which can be calculated as the inverse of the period 455 of the waveforms, is at a rate that is below the human flicker fusion frequency, for example, in the range of 10 to 12 Hz (a good frequency range for attracting attention). It should be noted that the aforementioned example of a range of potential drive frequencies is a non-limiting example. In another non-limiting example, a drive frequency alternatively may be at a rate in another possible range, such as, for example, in the range of 1 Hz to 30 Hz. Likewise, for electronic detection, the drive frequency could be chosen based on the capabilities of the electronic system, such as, for example, a 30 or 240 frame-per-second (fps) video camera of a smartphone. Note that while the depth of modulation of the two drive signals 425-1, 425-2 is depicted as 100% (i.e. either full ON or full OFF), other modulation depths may be used as needed in order to achieve the desired appearance of constant fluorescence from one of the fluorescing entities and flickering fluorescence from the other.

The ON periods 435-1, 435-2 of the drive signals 425-1, 425-2 are depicted in FIG. 4 as being non-overlapping, as it is intended that either one or the other of the excitation outputs 320-1, 320-2 would be active at any time. It should be understood that the drive signals 425-1, 425-2 may include an overlapping portion of some amount such that flicker or constant, non-flickering intensity is still observable by the human or machine. Thus, the term "substantially non-overlapping" is used herein to cover cases of non-overlapping drive signals, or of drive signals having an overlapping portion. The amount of tolerable overlap could be dependent on a particular application and on the fluorescence excitation and emission properties of the fluorescing materials (e.g., the FI 105 and the FE 110).

Furthermore, within each of the ON periods 435-1, 435-2 determined by the drive signals 425-1, 425-2, the illumination intensities of the excitation outputs 320-1, 320-2 can be controlled by any of several means. If the drive signals are also capable of directly powering the illumination sources 124-1, 124-2, then the amplitudes 430-1, 430-2 of the respective drive signals 425-1, 425-2 can reflect the relative intensities of the excitation outputs 320-1, 320-2. Alternatively, the intensity of the excitation sources 320-1, 320-2 may be controlled by other circuitry, and the drive signals 425-1, 425-2 may function to turn the illumination sources 124-1, 124-2 on and off to produce excitation outputs 320-1, 320-2 at that separately controlled intensity.

In another embodiment, a filter or other intensity-reducing material may be included between individual or respective excitation outputs 320-1, 320-2 of the illumination sources 124-1, 124-2, and the fluorescent sample, to reduce an effective illumination intensity of said individual or respective excitation outputs 320-1, 320-2.

In another embodiment, the excitation outputs 320-1, 320-2 may be set for maximum intensity, and their effective intensity may be controlled by pulse width modulation (PWM) of the respective drive signals 425-1, 425-2, resulting in an apparent reduced intensity.

Figure 5A:
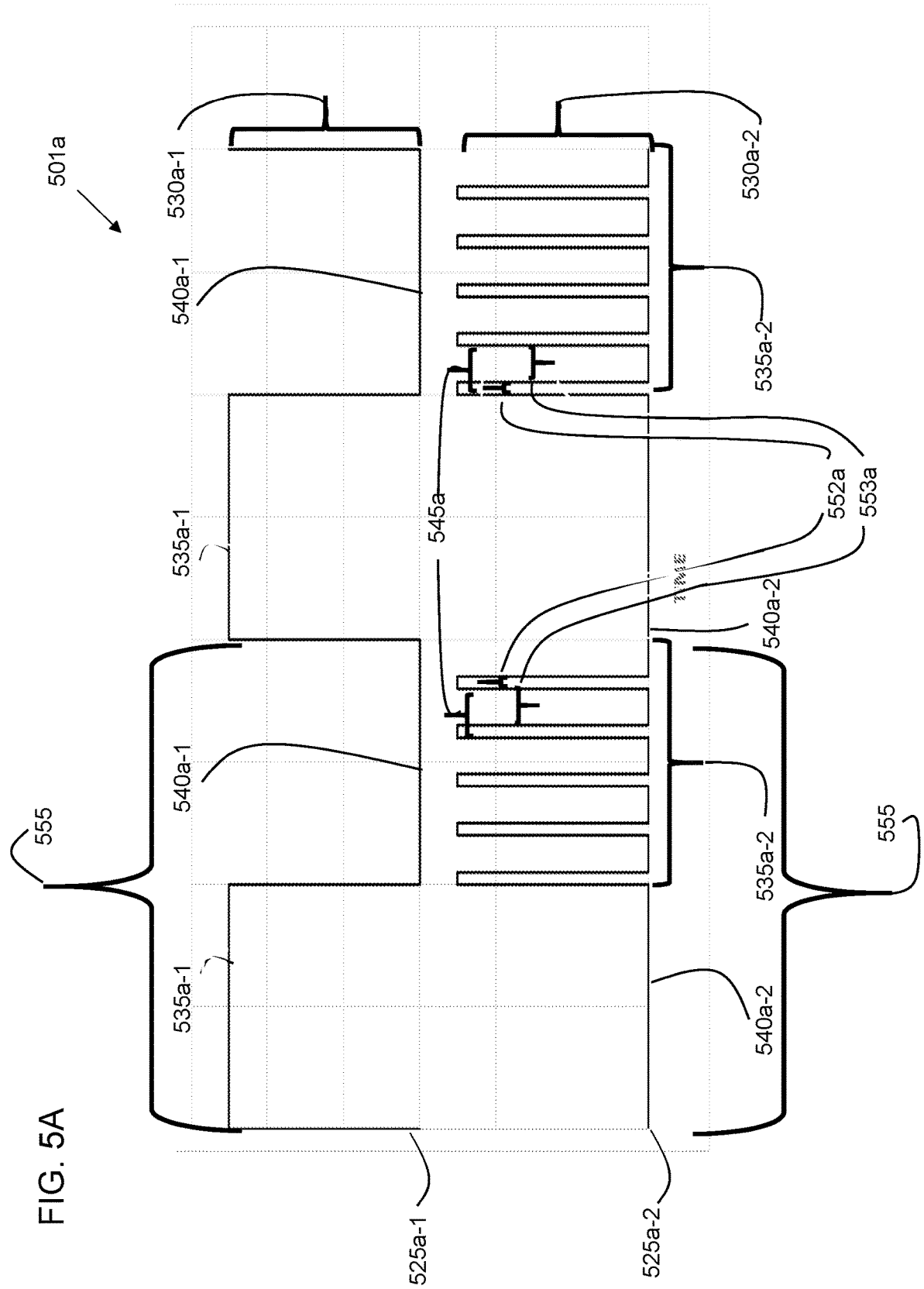
Figure 5B:
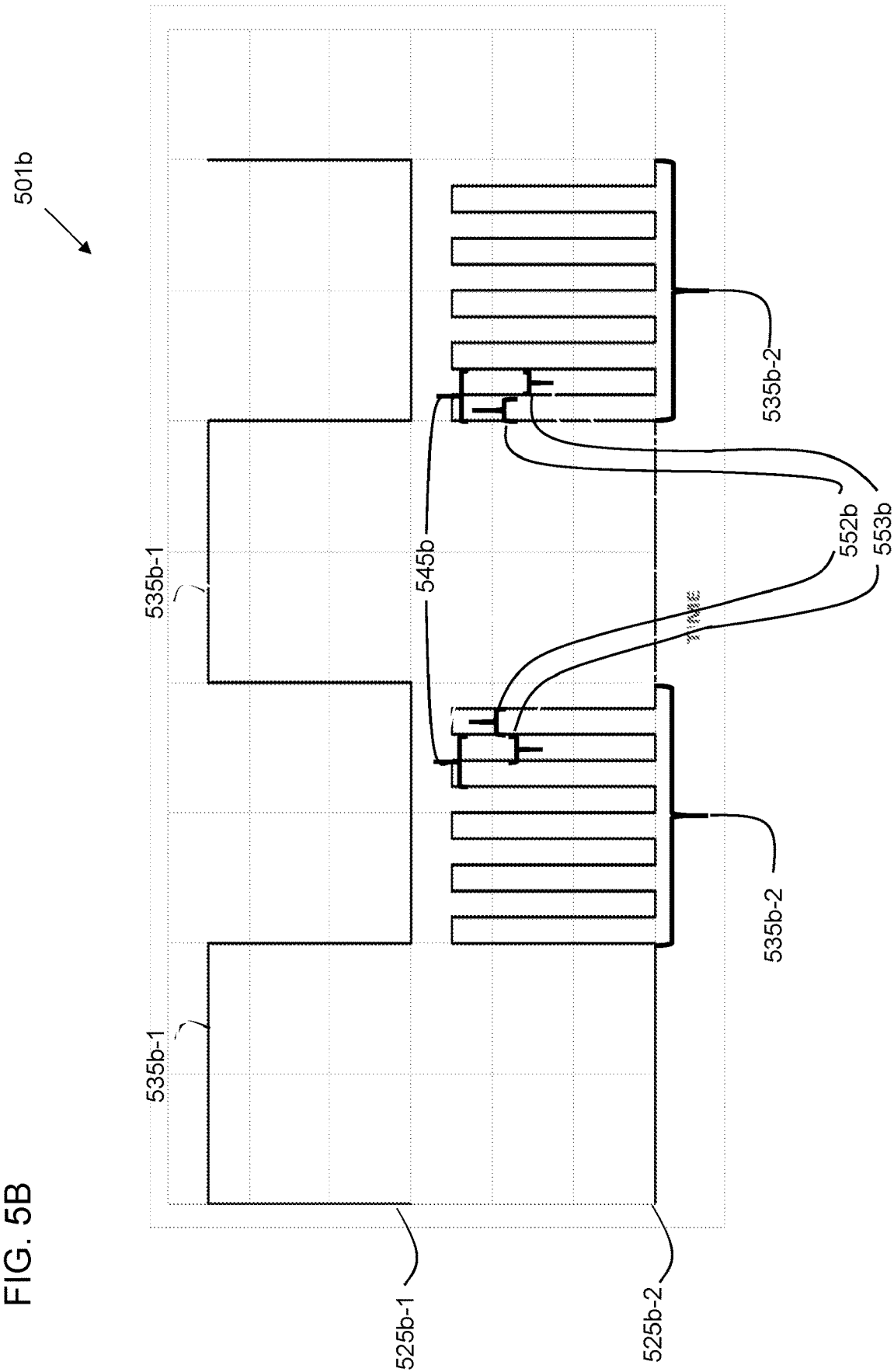

FIGS. 5A-C are waveform plots 501a-c of drive signals 525a-1, 525a-2, 525b-1, 525b-2, 525c-1, and 525c-2, wherein PWM is applied to one or both of two illumination sources 124-1, 124-2, according to embodiments of the present disclosure. In this method, during its ON period, an illumination source 124-1/124-2 is driven by a pulsed control signal at a modulation frequency (calculated as the inverse of the period 545) that is higher than the detection capability (flicker fusion frequency) of the human or electronic observer, so the corresponding individual excitation output 320-1/320-2 will not appear to flicker during its ON periods 535a-1/535a-2, 535b-1/535b-2, 535c-1/535c-2, but will appear reduced in intensity. The duty cycle of a waveform of this type is defined as the ratio of the ON time 552a-c to the full period 545a-c. By varying the ON time 552a-c of this higher frequency pulse control, the apparent intensity of each excitation output 320-1, 320-2 can be controlled. Thus, in FIGS. 5A-C, we see an illumination source, e.g., illumination source 124-1, corresponding with S1 320-1 (associated with the upper traces in these examples) being driven by a simple square wave 525a-1, 525b-1, 525c-1, while for S2 320-2 (associated with the lower traces in these examples) the corresponding illumination source, e.g., illumination source 124-2 is being turned ON 552a-c and OFF 553a-c very rapidly, i.e., at modulation frequency of the inverse of the period 545a-c, during its nominal ON interval 535a-2, 535b-2, 535c-2 with duty cycles of 25%, 50%, and 75% respectively.

FIG. 5A shows the drive signal 525a-2 of the royal blue excitation output 320-2 as having a lower duty cycle during its ON period 535a-2 than the duty cycle of FIG. 5B during the ON period 535b-2. Likewise, FIG. 5B shows the drive signal 525b-2 of the royal blue excitation output 320-2 as having a lower duty cycle than the duty cycle of FIG. 5C during the ON period 535c-2.

The foregoing description of pulse width modulation is but one of many ways that the actual or apparent illumination intensity of the excitation beams 120-1 and 120-2 can be controlled. The key is that if the wavelength ranges of excitation sources S1 320-1 and S2 320-2, i.e., of beams 120-1 and 120-2, respectively, are such that the excitation sources S1 320-1 and S2 320-2 excite the fluorescence of the FE 110, and if their apparent intensities can be adjusted, by any of the analog or digital approaches discussed previously or by any other way that is known in the art, the adjustment can be such that the intensity of the fluorescence emitted by FE 110 as perceived by a human eye, camera, or detector is functionally the same for both excitation outputs 320-1, 320-2. Since one 320-1/320-2 or the other 320-2/320-1 of the excitation outputs is always ON, the fluorescence of the FE 110 will appear to be constant and unblinking. The relative excitation of the FI 105 will not be the same from these two excitation outputs 320-1, 320-2, so the fluorescence response will change between the intervals 535a-1, 535b-1, 535c-1/535a-2, 535b-2, 535c-2, creating the flickering effect.

For the human observer, the resultant flickering is the goal in itself and will result in enhanced detectability of the FI 305. This is the case if the flickering is observed directly by eye, or if the observer is watching the display of a video monitor. For an electronic system, the flickering could be detected and processed in any number of ways. For example, for a video camera, the pulsing frequency (i.e., drive frequency) 555 could be synchronized with the video frame rate to produce a similar flickering effect. For a typical video camera operating at 30 frames-per-second, illumination source 124-1 emitting wavelength range $\lambda_1$ (S1 320-1) could be held ON 535a-1, 535b-1, 535c-1 for one frame and illumination source 124-2 emitting wavelength range $\lambda_2$ (S2 320-2) held ON 535a-2, 535b-2, 535c-2 for the subsequent frame, this pattern being repeated and resulting in an apparent flashing at 15 Hz. Or, the pattern could be S1 124-1 for two frames and S2 124-2 for one frame, resulting in an apparent flashing at 10 Hz. Other patterns are possible. Similar variations apply to higher frame rates. For example, at 60 frames-per-second, a pattern, in which the drive signal 525a-1, 525a-2, 525b-1, 525b-2, 525c-1, 525c-2 is synchronized such that the ON period 535a-1, 535a-2, 535b-1, 535b-2, 535c-1, 535c-2 for the excitation outputs 320-1, 320-2 switches every three of six frames, would produce an apparent flicker at 10 Hz. A synchronization, such that the one excitation output 320-1/320-2 is on for three frames and the other 320-2/320-1 for two frames, would produce a flicker at 12 Hz. Such a pattern could be applied to any frame rate.

In another example, an appropriate imaging system recognizes the unblinking (within some threshold setting) pixels electronically, via a processing element and software, and subtracts them from the image, while at the same time rendering the blinking pixels as constant, thus resulting in a stabilized image with the FE 110 removed. In yet another example, the blinking pixels are detected and artificially highlighted with an indicator color. Note that neither of these approaches is a simple subtraction of one image from another image as described by others. If the detection of the flicker effect is to be done within an image acquisition system that includes the image acquisition device, it is not necessary that the flicker be at a rate that is detectable by a human observer. With a video frame rate of 240 frames-per-second and a synchronization such that each excitation output 320-1, 320-2 is on for one frame in an alternating pattern, the flicker would be at 120 Hz. This would not produce a visible flicker effect to a human observer, but the resulting frame-to-frame variation could be detected by the image acquisition system.

In one scenario, the user could be investigating an area in which the nature of any fluorescing features 105, 110 is not known in advance, and wavelength selections, and/or relative excitation output illumination intensities 530a-1, 530a-2 needed to highlight the FI 105 could be chosen by trial and error in the field from a variety of illumination sources. An example embodiment may thus include multiple illumination sources (i.e., lights) of a variety of different wavelength ranges that are user-selectable to allow for the trial and error. The operator could survey the scene with different wavelengths in sequence, noting relative changes in fluorescence, and then use that information to select wavelengths and/or illumination intensities 530a-1, 530a-2 to use in embodiments of the new method disclosed herein.

In another scenario, the user knows the spectral characteristics of either or both of the FI 105 and the FE 110, and may use that information to make selections, or at least candidate selections, of wavelengths and illumination intensities.

In yet another scenario, the user will be applying to surfaces in an environment a spray or other form of coating that contains a fluorescent substance for which the spectral properties are known and that will associate with a target feature of interest to turn into a fluorescent feature of interest 105. The user can scan the surfaces in advance to detect any pre-existing sources of extraneous fluorescence 110 and determine the wavelengths and illumination intensities needed to render these fluorescent features 105, 110 either blinking or unblinking in order to contrast with the indicator that will then be applied. For example, the user might first look at a surface, then apply a fluorescent fluid to highlight cracks for failure analysis, sometimes referred to as non-destructive testing.

In other cases, the selection of wavelengths and/or illumination intensities, may be based on prior experience of the user or of others. This outline of approaches is not intended to be comprehensive and does not preclude use of other approaches to arrive at the wavelengths and/or illumination intensities to be used as alternating excitation outputs 320-1, 320-2.

Note that in configuring the two excitation outputs 320-1, 320-2, it is not necessary that both excitation outputs 320-1, 320-2 excite one of the fluorescent features 105/110 while only one of them 320-1/320-2 excites the other 110/105. If this were the case, it would achieve the maximum contrast between the blinking and steady features, but any differential in the excitation of the different fluorescent features 105, 110 would result in contrast enhancement by the blinking effect.

The method can be applied to direct searching by eye with portable illumination sources, such as a flashlight or similar. It could also be applied to direct viewing under a microscope, such as to aid in sorting/selecting organisms (e.g., Drosophila, C. elegans, etc.) that have been genetically modified to express fluorescent proteins, e.g., through an imaging endoscope, or via other fluorescence imaging means. Similarly, it can be applied to viewing by a video camera in real time in accordance with embodiments of the methods described herein. The video camera may be in close proximity to the user, may be mounted in a remote location, as for monitoring, or may be mounted on a moving platform such as a remote or autonomous vehicle or airborne drone.

EXEMPLIFICATION

To illustrate the teachings and embodiments presented above, fluorescence of a portion of an image of an octopus is provided in FIGS. 6, 7, and 8A-D as described hereinbelow. This is representative of one potential area of application, the study and conservation of artworks.

Figure 6:
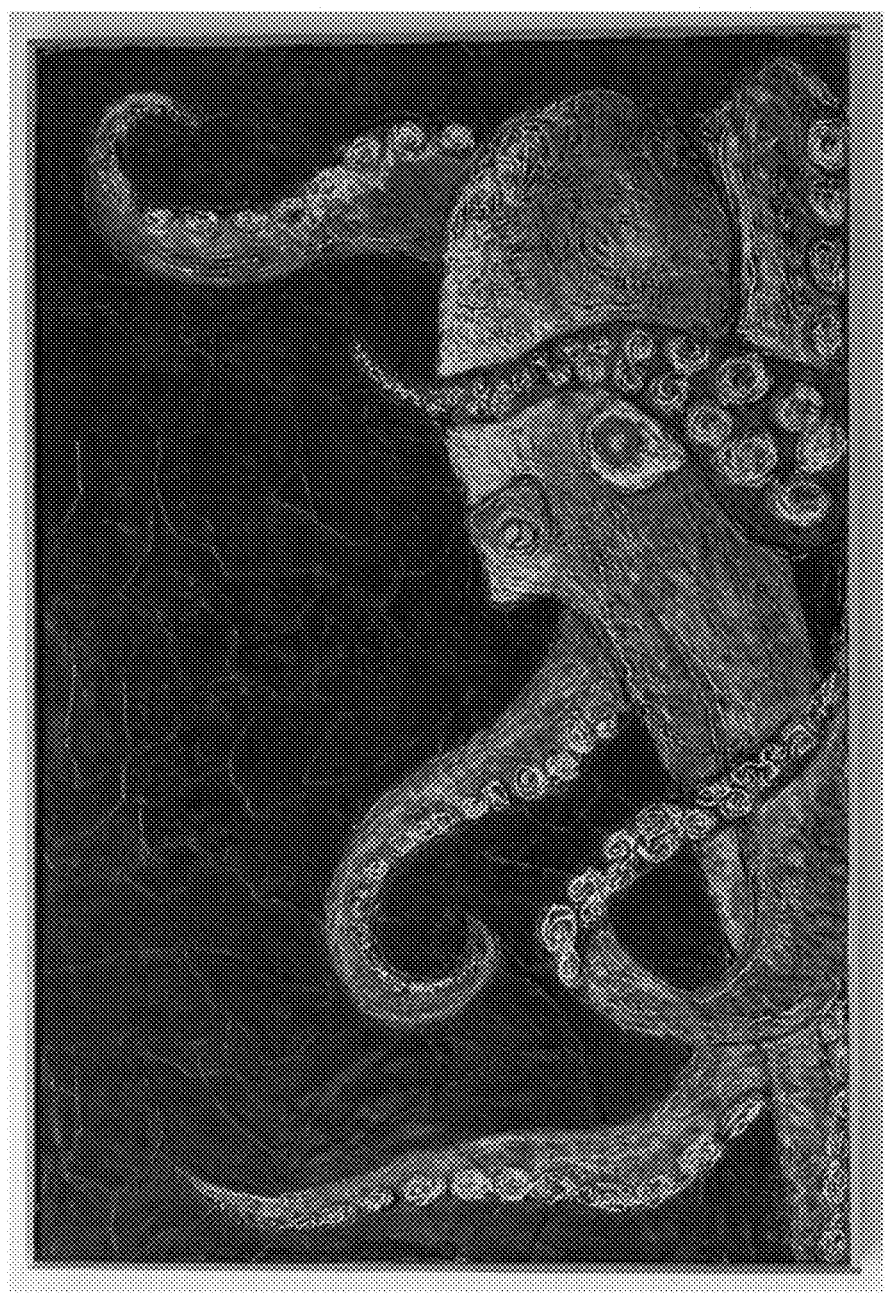
FIGS. 6, 7, and 8A-D are photographs according to an exemplification of embodiments of the present disclosure.

FIG. 6 shows a full view of a photograph of a painting 602 of an octopus that includes certain paints that fluoresce as a function of an excitation wavelength, e.g., the wavelength of excitation outputs 320-1, 320-2, such as ultraviolet (UV) in the vicinity of 365 nm and royal blue in the vicinity of 450 nm. The painting 602 may alternatively be a drawing or print. Because the images below are snapshots in time, the flickering that would be observable by a human or machine observer is not shown.

Figure 7:

FIG. 7 shows an area of detail 703 of the painting 602 illuminated by an excitation output 320-1 having a wavelength within a UV range, and imaged through a filter that blocks reflected UV and transmits all visible wavelengths. Under these conditions, the fluorescence of some of the paint 760 appears bluish-white.

FIGS. 8A-D illustrate a sequence of images of the same area of detail 803 as the area of detail 703 of FIG. 7, which has been illuminated as per embodiments described herein. This sequence serves to demonstrate how an observer would perceive complementary flickering and non-flickering regions, so as to differentiate a fluorescence of interest (FI) 105 from an extraneous fluorescence (FE) 110.

Figure 8A:
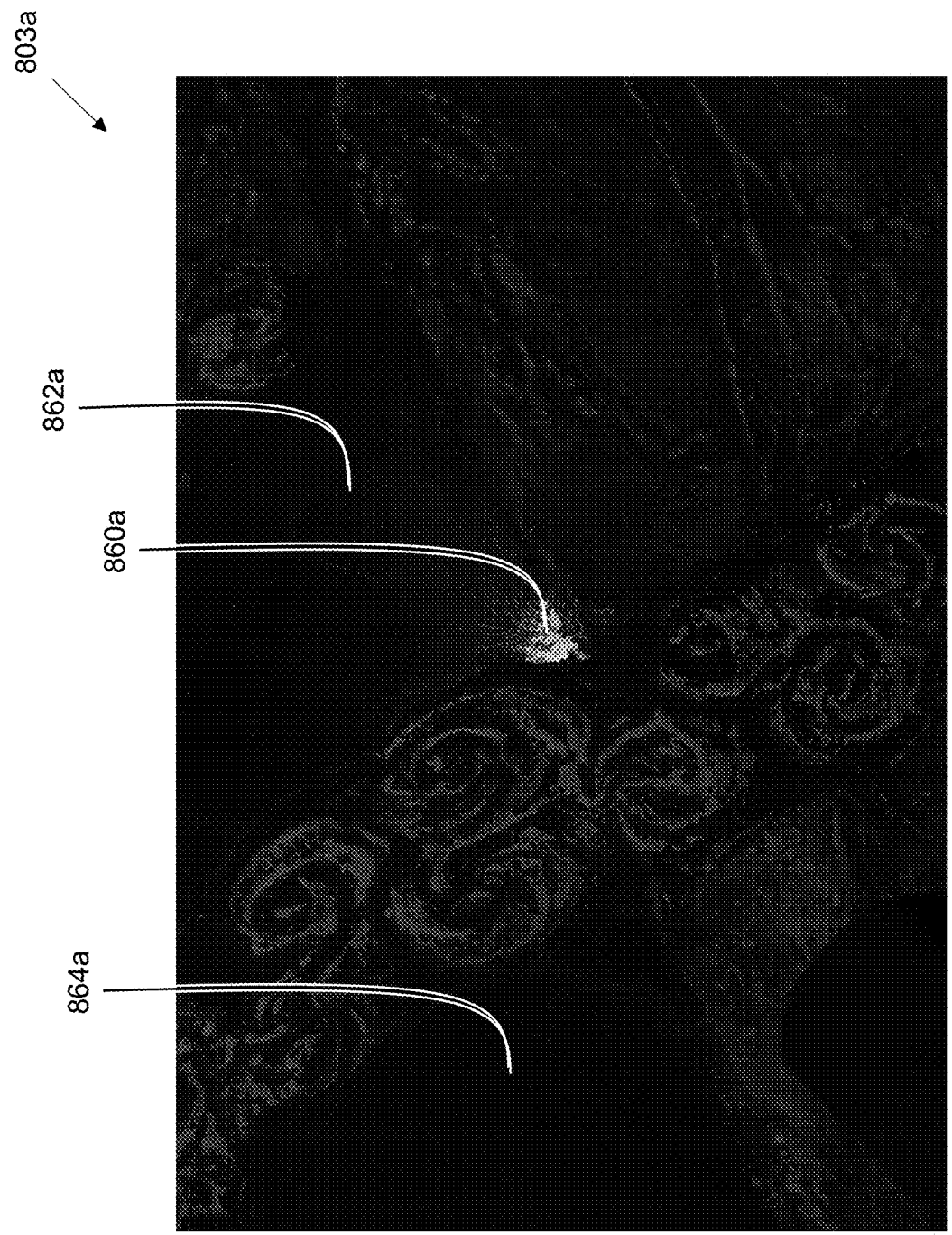

FIG. 8A is an image of an area of detail 803a of the same area of detail 703 as FIG. 7, again illuminated by a UV excitation output 320-1, but imaged through a longpass filter 215 that blocks wavelengths shorter than approximately 500 nm and transmits wavelengths longer than this cutoff. The result is that the fluorescence emission 860a appears a yellowish-green. Complementary area 862a and non-fluorescing area 864a can be seen as not fluorescing in FIG. 8A.

Figure 8B:
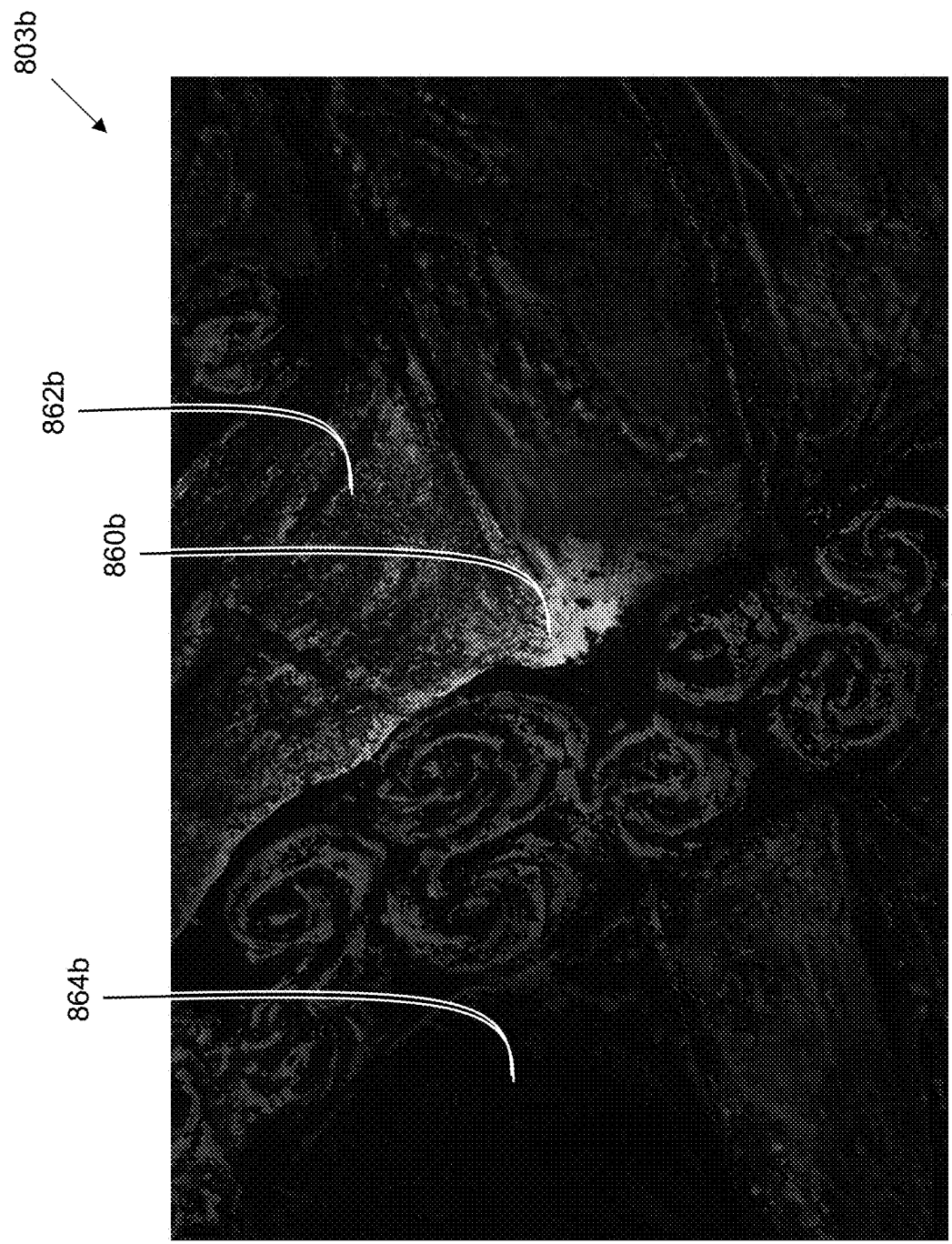

FIG. 8B is an image of an area of detail 803b of the same area of detail 703 as FIG. 7, but illuminated by an excitation output 320-2 having a wavelength within a royal blue range of visible light, specifically, of approximately 450 nm, and imaged through the same longpass filter 215 used for FIG. 8A.

The image sequence comprised by FIGS. 8A and 8B is the condition that would be experienced in the field according to an embodiment, with alternating excitation outputs 320-1/ 320-2 with wavelength ranges $\lambda_1$ and $\lambda_2$, and with both images being viewed through the longpass filter 215. The area of paint that fluoresces in response to the royal blue excitation output 320-2 includes an area 860b corresponding to the area 860a that was excited to fluoresce by the UV excitation output 320-1, but also includes additional areas 862b corresponding to the complementary area 862a that was not fluorescing in FIG. 8A. Non-fluorescing area 864b can be seen as continuing to refrain from fluorescence like its counterpart area 864a in FIG. 8A.

For the purposes of this exemplification, we designate the paint area 862b that fluoresces under excitation only by royal blue 320-2 and not by UV 320-1 as the fluorescence of interest (FI) 105, while the paint area 860a, 860b that fluoresces under excitation by both UV 320-1 and royal blue 320-2 is the extraneous fluorescence (FE) 110. Referring back to FIG. 3, the waveform plot 300 depicts excitation spectra representative of the areas of paint 862b and 860a, 860b that we are calling FI 105 and FE 110, respectively. The thin solid line 311 is the measured excitation spectrum data for FE 110 and shows that this paint area 860 can be excited both by a UV excitation output 320-1 in the region of 365 nm and also by a royal blue excitation output 320-2 in the region of 450 nm. The thick dashed line 306 is the measured data for FI 105 paint area 862a, b and indicates that this paint may show little fluorescence response to excitation by a UV excitation output 320-1 while it would fluoresce when excited by a royal blue excitation output 320-2.

Figure 8C:
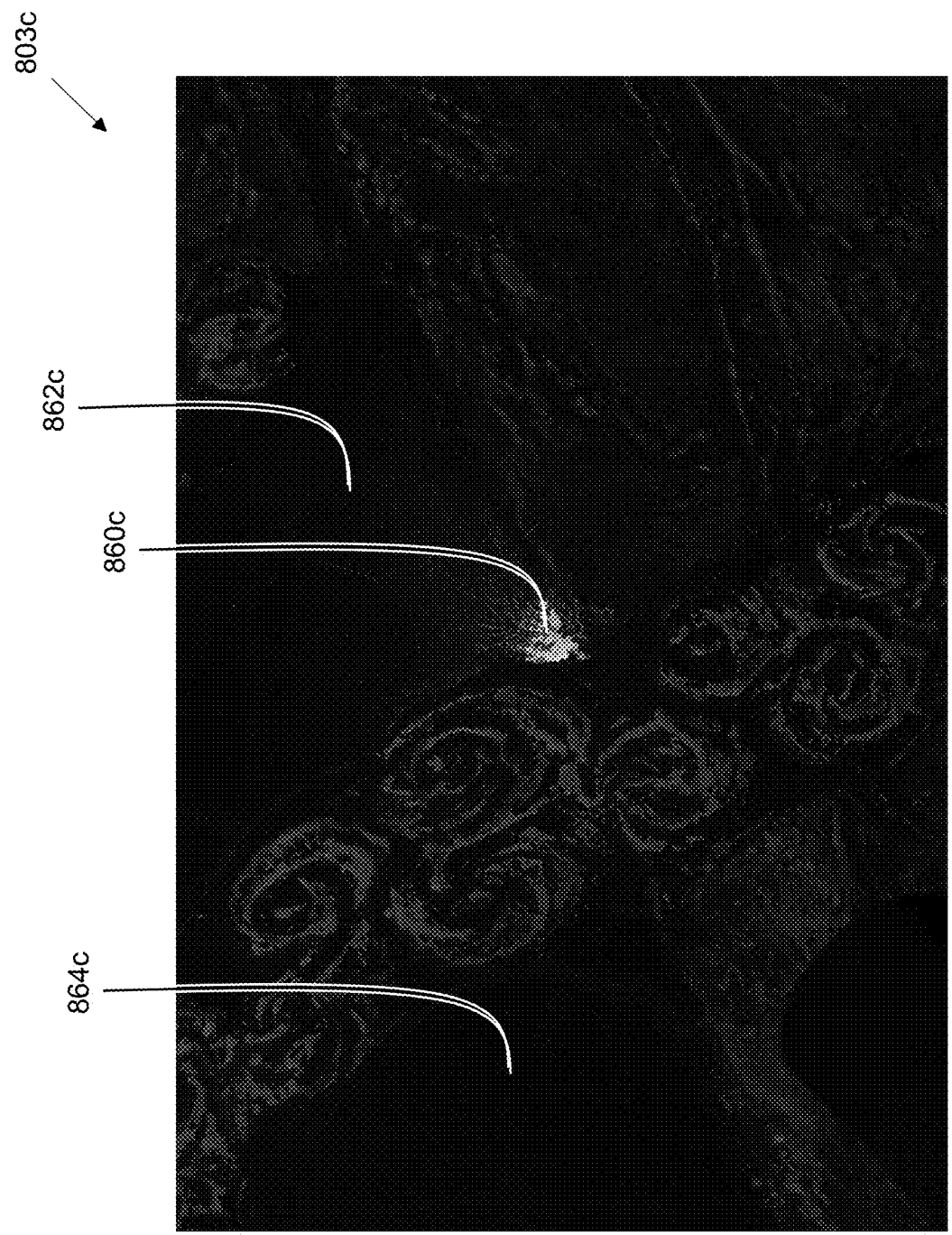

FIG. 8C is an image, identical to the image of FIG. 8A, showing an area of detail 803c that is the same area of detail 803a, 803b as shown in FIGS. 8A and 8B. The area of detail 803c is again illuminated in FIG. 8C by a UV excitation output 320-1, and imaged through the same longpass filter 215 used for FIGS. 8A and 8B. Area 860c, corresponding to area 860a in FIG. 8A, can be seen as fluorescing in FIG. 8C.

Likewise, complementary area 862c and non-fluorescing area 864c can be seen in FIG. 8C as not fluorescing.

Figure 8D:
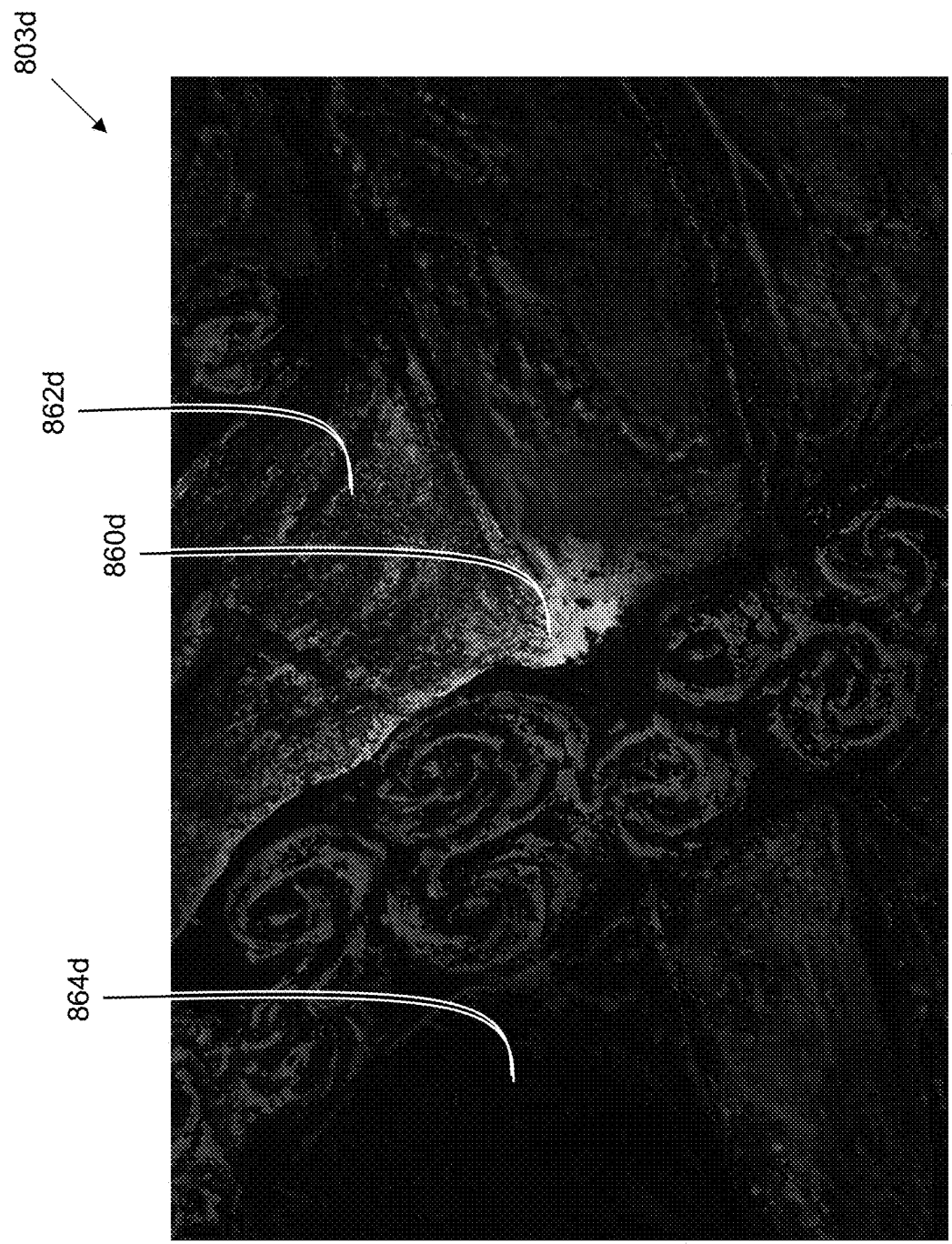

FIG. 8D is an image, identical to the image of FIG. 8B, showing an area of detail 803d that is the same area of detail 803a, 803b, 803c as shown in FIGS. 8A-C. The area of detail 803d is again illuminated in FIG. 8D by a royal blue excitation output 320-2 of approximately 450 nm and imaged through the same longpass filter 215 used for FIGS. 8A-C. Area 860d, corresponding to area 860b in FIG. 8B, as well as complementary area 862d, corresponding to area 862b in FIG. 8B, can be seen as fluorescing in FIG. 8D. Likewise, non-fluorescing area 864d can be seen in FIG. 8D as continuing to refrain from fluorescence like its counterpart area 864c in FIG. 8C.

FIGS. 8A-D thus represent an instance of the image alternation resulting from the sequenced control of the two illumination sources 124-1, 124-2. If there is no control of the illumination source intensities, there is the potential for the fluorescence intensity of the paint area 860a-d of the FE 110 to differ between images during successive illumination periods. This was in the fact the case using the fluorescence excitation light sources provided by NIGHTSEA (Lexington, Mass.) in the form of either the UV and Royal Blue light heads for the Stereo Microscope Fluorescence Adapter or the Xite-UV and Xite-RB (UV and Royal Blue) flashlights. In their standard forms, without additional intensity control, the fluorescence of paint area 860b of FIG. 8B under royal blue illumination was noticeably brighter than that of paint area 860a of FIG. 8A under UV illumination, and in the resultant alternation of images 8A-D there was an apparent flicker in this area, in addition to the stronger flickering between paint area 862a and 862b. The referenced light sources are all based on LED technology and their apparent illumination intensity can be controlled by pulse width modulation. Since the apparent intensity from the royal blue illumination was stronger, it is this one that must be reduced in accordance with embodiments of the method.

In the method described herein, the user or an automated processing system would adjust the duty cycle 552a-c of the royal blue excitation output 320-2 drive signal 525a-2, 525b-2, 525c-2 until the apparent intensity of the area of paint 860a, 860b seen to be fluorescing in FIGS. 8A and 8B is the same during the drive (ON) periods 535a-1, 535a-2, 535b-1, 535b-2, 535c-1, 535c-2 of both the UV excitation output 320-1 and the royal blue excitation output 320-2. Since one 320-1/320-2 or the other 320-2/320-1 of these excitation outputs is operating at all times, that area of paint 860a, 860b would appear to have a constant, non-flickering fluorescing intensity. In contrast, the area of paint 862a, 862b that fluoresces under royal blue 220-2 (862b) but does not fluoresce under UV 220-1 (862a) would appear to be flickering on and off at a 10 Hz rate, rendering it easy to distinguish from the non-flickering area 860a, 860b, thus identifying the FI 105.

Figure 9A:
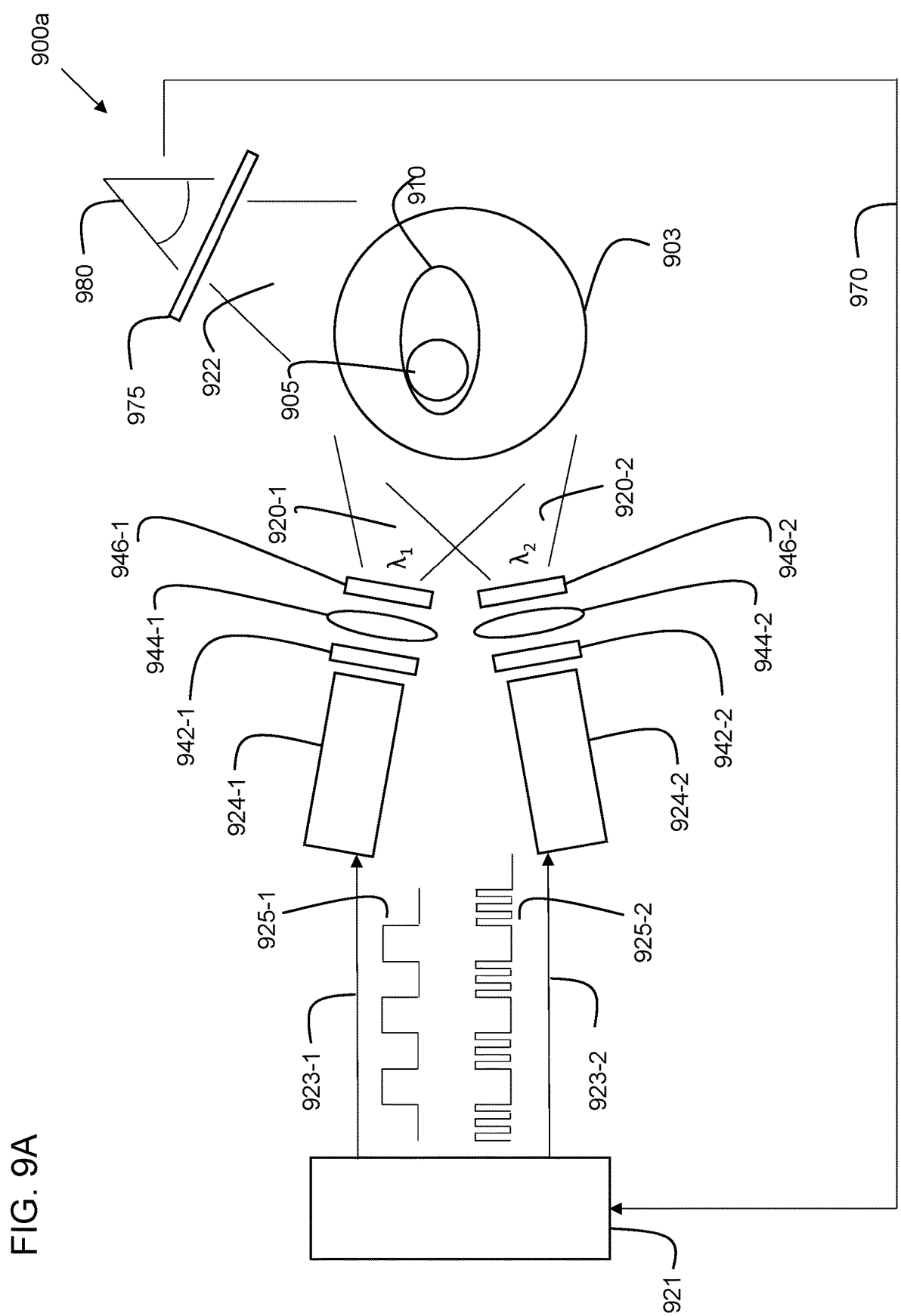

FIG. 9A illustrates an embodiment 900a of the system such as was used to collect the images for FIG. 8A-D. Light sources, i.e., illumination sources 924-1 and 924-2, represent the UV and royal blue lights, respectively. In some embodiments, such as the embodiment 900a, a fluorescent sample is arranged within an illumination region 903 such that the illumination sources 924-1, 924-2 produce a substantially uniform field of illumination across substantially the entire area of the fluorescent sample. In the embodiment 900a, both illumination sources 924-1, 924-2 include LEDs (not shown) of appropriate wavelength output and also include filters 942-1, 942-2 to trim the spectral output, and focusing optics 944-1, 944-2 to concentrate the beams 920-1, 920-2 in the direction of the area 903 to be illuminated, i.e., the illumination region. Optional diffusing elements 946-1, 946-2 may be used to further adjust the pattern of the excitation output beams 920-1, 920-2. These beams 920-1, 920-2 are incident on the area of the painting 803a-d shown FIGS. 8A-D, with the FI 105 represented by 905 and the FE 110 represented by 910. Note that these are shown as overlapping as actually occurs in the detail view of the painting 803a-d.

Continuing with respect to FIG. 9A, a controller 921 provides the drive signals 923-1 and 923-2 to cause the illumination sources 924-1 and 924-2 to illuminate alternately, in this case at a frequency of 10 Hz. The drive signals additionally provide the pulse width modulation signals 925-1 and 925-2 to control the effective intensity of the light sources and thus also of the resulting fluorescence emission 922. Since in this case the UV source elicits the weaker fluorescence response there is no additional intensity control during the ON periods of waveform 925-1. The ON periods of waveform 925-2 controlling the royal blue illumination source 924-2 include a pulse width modulation signal at a frequency that is greater than the flicker fusion frequency of a human observer so that alternation within the ON period is not observable. The fluorescence reaches the observer through a barrier filter 975 that removes the reflected excitation light. For the purposes of this figure the observer 980 is a human operator viewing the illuminated area 903 either directly or on the monitor of a video camera or display. The operator has means represented by the feedback path 970 to adjust the pulse width modulation 925-2 to make the fluorescence intensity of the FE 910 effectively the same from one illumination period to the next so that it appears constant.

Figure 9B:
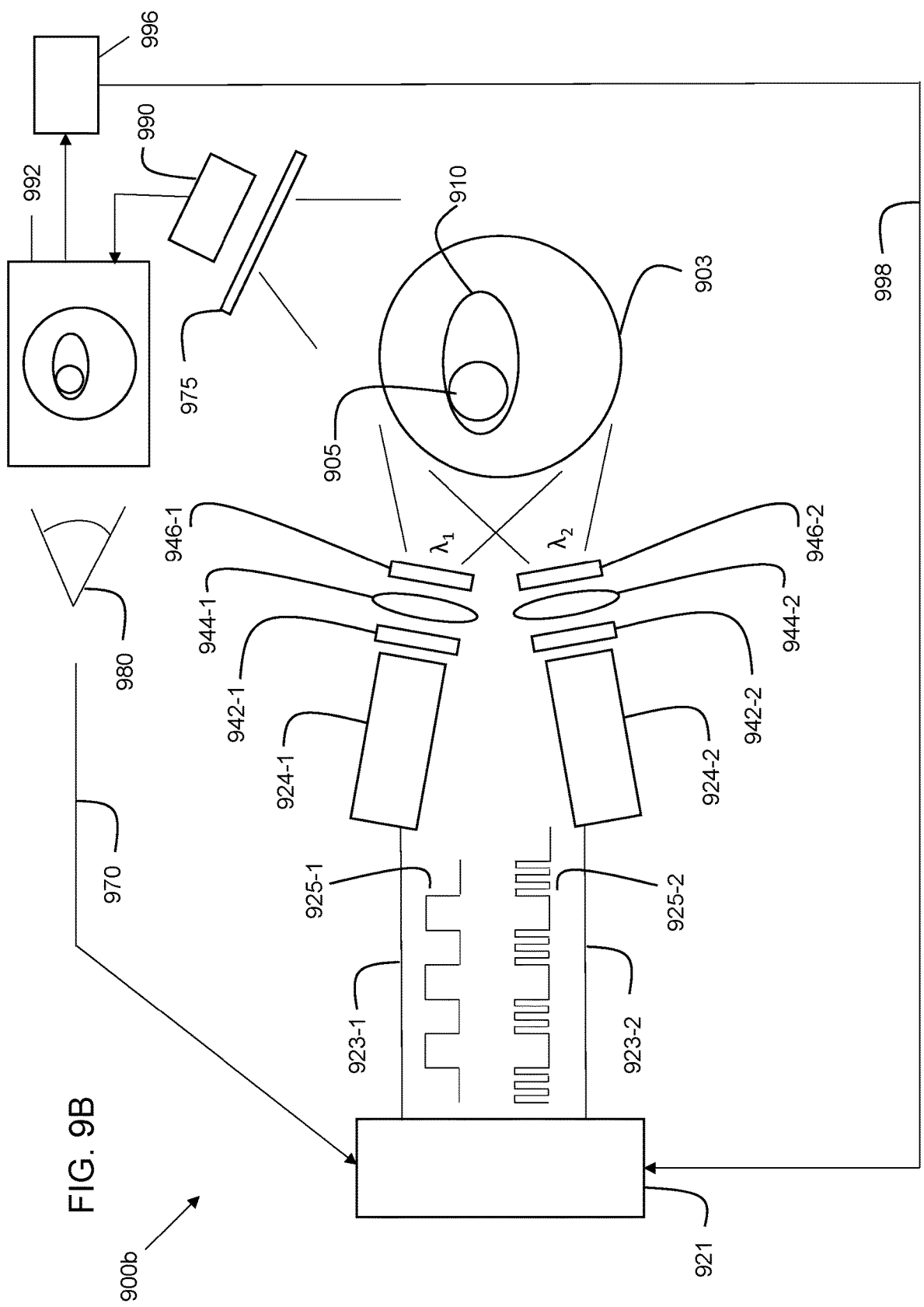

FIG. 9B illustrates an alternative embodiment 900b in which the image of the illumination area 903 is captured by a camera 980 and presented on a display 990. The human observer 980 can control the light sources by manual or electronic control means indicated by 970. In another embodiment the human observer 980 could interact with the display to manually select the FI 905 and FE 910, and a processor 996 with appropriate software provides the feedback 998 to the controller 921 to automatically adjust the modulation 925-2 to achieve the desired constant appearance of the FE 910.

FIG. 10A illustrates an alternative embodiment 1000a in which the outputs from the two illumination sources 1024-1, 1024-2 are directed into a single pathway by means of a bifurcated fiber optic 1065 or an alternative such as a system of reflectors and light pipes (not shown in FIG. 10A). Additional optical elements such as lenses or diffusers (not shown in FIG. 10A) may be included to control the area of illumination 1003.

Figure 10B:
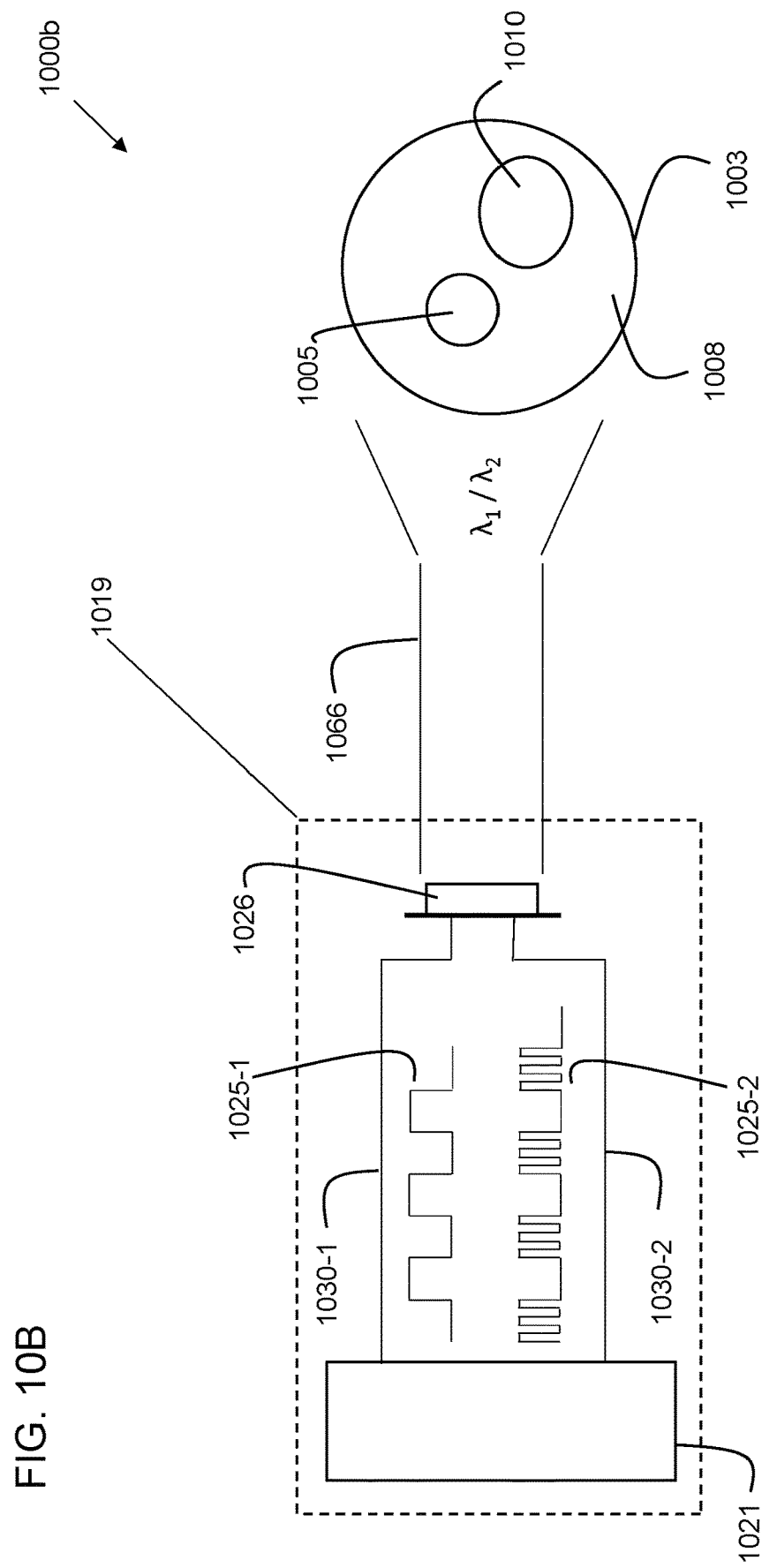

FIG. 10B illustrates an alternative embodiment 1000b of an illumination module 1019, which includes a controller 1021 providing drive signals 1030-1, 1030-2 to a single illumination element 1026 that may include separate light sources (not shown in FIG. 10B) or a single light source (not shown in FIG. 10B) able to produce excitation outputs 320-1 and 320-2 having wavelengths within wavelength ranges $\lambda_1$ and $\lambda_2$ as specified for an application. These excitation outputs 320-1 and 320-2 are directed into a common pathway 1066 to illuminate the field of view, i.e., illumination region 1003, and any fluorescence of interest 1005, extraneous fluorescence 1010, or background fluorescence 1008 that may be present. There may be additional elements (not shown in FIG. 10B), such as lenses, filters, and/or diffusers, as needed.

In such alternative embodiments, the at least two excitation outputs 320-1 and 320-2 may be provided by a single illumination element 1026 including a wavelength shifting component (not shown in FIG. 10B) such that the at least two excitation outputs 320-1 and 320-2 have wavelengths in respective different wavelength ranges, e.g., wavelength ranges $\lambda_1$ and $\lambda_2$. In such embodiments, the at least two excitation outputs 320-1 and 320-2 may be so configured through direct control of the single illumination element 1026 or by way of the wavelength shifting component.

In yet another alternative embodiment, the at least two excitation outputs 320-1 and 320-2 may be provided by a single broadband illumination element 1026 including (not shown in FIG. 10B). In such an embodiment, the single broadband illumination element 1026 may thus have its output filtered to provide the at least two excitation outputs 320-1 and 320-2, respectively capable of producing electromagnetic radiation, e.g., visible, infrared, or ultraviolet light, in the at least two distinct wavelength ranges, e.g., wavelength ranges $\lambda_1$ and $\lambda_2$. In other words, embodiments disclosed herein are agnostic as to the number of illumination source(s) used to provide the at least two excitation outputs 320-1 and 320-2 in at least two respective wavelength ranges.

While example embodiments have been particularly shown and described, it will be understood by those skilled in the art that various changes in form and details may be made therein without departing from the scope of the embodiments encompassed by the appended claims.

What is claimed is:

1. A method of distinguishing a fluorescent feature of interest from an extraneous fluorescent feature, the method comprising:
    illuminating an illumination region with at least two excitation outputs of at least one illumination source, the at least one illumination source sequentially providing the at least two excitation outputs in different respective wavelength ranges, the at least two excitation outputs being functions of a common drive frequency with respective illumination periods being substantially non-overlapping, the drive frequency capable of causing fluorescent features in the illumination region to emit fluorescence with a flicker observable to an observer in response to at least one of the at least two excitation outputs, the fluorescent features including the fluorescent feature of interest and the extraneous fluorescent feature; and
    controlling an intensity of illumination of at least one of the at least two excitation outputs during its illumination period, the controlling causing the fluorescence emission of a given one of the fluorescent feature of interest and the extraneous fluorescent feature to be functionally equivalent during the respective illumination periods of the sequentially provided at least two excitation sources, resulting in an appearance of the given one to emit fluorescence at a constant level.

2. The method according to claim 1 wherein controlling the intensity of the at least one of the at least two excitation outputs includes controlling the intensity by applying pulse width modulation during its illumination period or by applying current control.

3. The method according to claim 1 further comprising adjusting the controlling to cause the fluorescence emission of the fluorescent feature of interest to have an appearance of emitting fluorescence at a constant level and the extraneous fluorescent feature to flicker.

4. The method according to claim 1 further comprising adjusting the controlling to cause the fluorescence emission of the extraneous fluorescent feature to have an appearance of emitting fluorescence at a constant level and the fluorescent feature of interest to flicker.

5. The method according to claim 1 further comprising filtering the fluorescence emission by a filter that substantially transmits the fluorescence emission from the fluorescent feature of interest.

6. The method according to claim 1 wherein the observer is a human and further enabling the human to adjust the drive frequency, the controlling, or both.

7. The method according to claim 1 wherein the observer is a fluorescence emission acquisition system and further comprising automatically processing sequential images to determine flickering of a pixel area and adjusting the controlling as a function of the flickering of the pixel area.

8. The method according to claim 7 wherein the fluorescence emission acquisition system captures images at a frame rate and wherein the drive frequency is an integer multiple below the frame rate.

9. The method according to claim 8 wherein the illumination periods of the at least two excitation outputs alternate at a rate at which the fluorescence emission acquisition system observes a flicker at a frequency of 50% of the frame rate or below.

10. The method according to claim 1 wherein the observer is a fluorescence emission acquisition system and further comprising automatically processing sequential images to determine flickering of a pixel area and presenting an augmented display of information from at least in the illumination region as a function of the flickering.

11. The method according to claim 1 wherein the fluorescent feature of interest includes at least one fluorescent feature of interest, and wherein the extraneous fluorescent feature includes at least one extraneous fluorescent feature.

12. A system for distinguishing a fluorescent feature of interest from an extraneous fluorescent feature, the system comprising:
    at least one illumination source arranged to illuminate an illumination region by providing at least two excitation outputs in different respective wavelength ranges, the at least two excitation outputs being functions of a common drive frequency and illuminating the illumination region in a sequential manner with respective illumination periods being substantially non-overlapping, the drive frequency capable of causing fluorescent features in the illumination region to emit fluorescence with a flicker observable to an observer in response to at least one of the at least two excitation outputs, the fluorescent features including the fluorescent feature of interest and the extraneous fluorescent feature; and
    a controller configured to cause the at least one illumination source to control an intensity of illumination of at least one of the at least two excitation outputs during its illumination period, the controller configured to cause the fluorescence emission of a given one of the fluorescent feature of interest and the extraneous fluorescent feature to be functionally equivalent during the sequential illumination periods, resulting in an appearance of the given one to emit fluorescence at a constant level.

13. The system according to claim 12 wherein the controller is: (i) an electronic modulator configured to cause the at least one illumination source to control the intensity of the at least one of the at least two excitation outputs by applying pulse width modulation during the illumination period of the at least one of the at least two excitation outputs, or by applying current control; or (ii) a mechanical or electromechanical filter arranged to control the intensity of the at least one of the at least two excitation outputs.

14. The system according to claim 12 wherein the controller is configured to be adjusted to cause the at least one illumination source to control the intensity of the at least one of the at least two excitation outputs during its illumination period to cause the fluorescence emission of the fluorescent feature of interest to have an appearance of emitting fluorescence at a constant level and the extraneous fluorescent feature to flicker.

15. The system according to claim 12 wherein the controller is configured to be adjusted to cause the at least one illumination source to control the intensity of the at least one of the at least two excitation outputs during its illumination period to cause the fluorescence emission of the extraneous fluorescent feature to have an appearance of emitting fluorescence at a constant level and the fluorescent feature of interest to flicker.

16. The system according to claim 12 further comprising a filter arranged between the illumination region and the observer to filter the fluorescence emission, the filter having a passband that passes at least fluorescence emitted at the constant level.

17. The system according to claim 12 wherein the observer is a human and wherein the at least one illumination source is configured to enable the human to adjust the drive frequency, the controller is configured to enable the human to adjust the intensity of the at least one of the at least two excitation outputs, or both.

18. The system according to claim 12 wherein the observer is a fluorescence emission acquisition system and further a processor configured to process sequential images automatically to determine flickering of a pixel area and to adjust the controlling as a function of the flickering of the pixel area.

19. The system according to claim 18 wherein the fluorescence emission acquisition system is configured to capture images at a frame rate and wherein the drive frequency is an integer multiple below the frame rate.

20. The system according to claim 19 wherein the illumination periods of the at least two excitation outputs alternate at a rate at which the fluorescence emission acquisition system observes a flicker at a frequency of 50% of the frame rate or below.

21. The system according to claim 12 wherein the observer is a fluorescence emission acquisition system and wherein the fluorescence emission acquisition system includes a processor configured to process sequential images automatically to determine flickering of a pixel area and present an augmented display of information from at least in the illumination region as a function of the flickering.

22. The system according to claim 12 wherein the fluorescent feature of interest includes at least one fluorescent feature of interest, and wherein the extraneous fluorescent feature includes at least one extraneous fluorescent feature.

23. A system for distinguishing a fluorescent feature of interest from an extraneous fluorescent feature, the system comprising:
means for illuminating an illumination region sequentially with at least two excitation outputs in different respective wavelength ranges, the excitation outputs being functions of a drive frequency with respective illumination periods being substantially non-overlapping, the drive frequency capable of causing fluorescent features in the illumination region to emit fluorescence with a flicker observable to an observer in response to at least one of the at least two excitation outputs, the fluorescent features including the fluorescent feature of interest and the extraneous fluorescent feature; and
means for controlling an intensity of at least one of the at least two excitation outputs during its illumination period, the controlling causing the fluorescence emission of a given one of the fluorescent feature of interest and the extraneous fluorescent feature to be functionally equivalent during the respective illumination periods of the sequentially provided at least two excitation sources, resulting in an appearance of the given one to emit fluorescence at a constant level.

* * * * *